US008477950B2

(12) United States Patent
Evans et al.

(10) Patent No.: US 8,477,950 B2
(45) Date of Patent: Jul. 2, 2013

(54) HOME THEATER COMPONENT FOR A VIRTUALIZED HOME THEATER SYSTEM

(75) Inventors: Gregory M. Evans, Raleigh, NC (US); Scott Curtis, Durham, NC (US); Kunal Kandekar, Jersey City, NJ (US); Ravi Reddy Katpelly, Durham, NC (US)

(73) Assignee: Novara Technology, LLC, Portsmouth, NH (US)

( * ) Notice: Subject to any disclaimer, the term of this patent is extended or adjusted under 35 U.S.C. 154(b) by 628 days.

(21) Appl. No.: 12/694,580

(22) Filed: Jan. 27, 2010

(65) Prior Publication Data

US 2012/0063603 A1 Mar. 15, 2012

Related U.S. Application Data

(60) Provisional application No. 61/236,297, filed on Aug. 24, 2009.

(51) Int. Cl.
*H04R 5/00* (2006.01)
(52) U.S. Cl.
USPC .............................................. 381/17; 725/32
(58) Field of Classification Search
USPC ............. 381/1, 17–22, 98, 103, 61, 300, 309, 381/310, 86; 725/32, 114, 87; 700/94; 348/379, 348/744
See application file for complete search history.

(56) References Cited

U.S. PATENT DOCUMENTS

| | | | |
|---|---|---|---|
| 5,805,804 A | 9/1998 | Laursen et al. | |
| 6,026,150 A | 2/2000 | Frank et al. | |
| 6,507,727 B1 | 1/2003 | Henrick | |
| 6,876,986 B1 | 4/2005 | Currans et al. | |
| 6,904,264 B1 | 6/2005 | Frantz | |
| 7,742,832 B1 | 6/2010 | Feldman et al. | |
| 8,171,152 B2 * | 5/2012 | White et al. | 709/231 |
| 2001/0016836 A1 | 8/2001 | Boccon-Gibod et al. | |
| 2002/0002039 A1 | 1/2002 | Qureshey et al. | |
| 2002/0059637 A1 | 5/2002 | Rakib | |
| 2002/0147689 A1 | 10/2002 | Falkner | |
| 2003/0060157 A1 | 3/2003 | Henrick | |
| 2003/0110126 A1 | 6/2003 | Dunkeld et al. | |
| 2003/0195854 A1 | 10/2003 | Wittkotter | |
| 2004/0024652 A1 | 2/2004 | Buhse et al. | |
| 2004/0181688 A1 | 9/2004 | Wittkotter | |
| 2004/0199654 A1 | 10/2004 | Juszkiewicz | |
| 2005/0021678 A1 | 1/2005 | Simyon et al. | |
| 2005/0060370 A1 | 3/2005 | Xue et al. | |

(Continued)

OTHER PUBLICATIONS

"AES standard method for digital audio engineering—Measurement of digital audio equipment," AES17-1998 (r2004), Revision of AES17-1991, published by Audio Engineering Society, Inc., copyright 1998, Audio Engineering Society, 20 pages.

(Continued)

*Primary Examiner* — Lun-See Lao

(57) ABSTRACT

The present disclosure relates to a Wide Area Network (WAN) based home theater system. In one embodiment, a home theater at a subscriber premises includes multiple home theater components, which include multiple audio playback components and a video playback component. Each home theater component is enabled to receive data from and send data to a virtualized home theater service via a WAN. In operation, each home theater component receives an appropriate media content stream for the home theater component from the virtualized home theater service via the WAN and provides playback of the media content stream according to the absolute playback timestamps for the media content stream.

17 Claims, 16 Drawing Sheets

U.S. PATENT DOCUMENTS

| | | |
|---|---|---|
| 2005/0114534 A1 | 5/2005 | Lee |
| 2005/0166135 A1* | 7/2005 | Burke et al. ............... 715/500.1 |
| 2005/0192820 A1 | 9/2005 | Simon et al. |
| 2005/0235278 A1 | 10/2005 | Wu et al. |
| 2005/0251455 A1 | 11/2005 | Boesen |
| 2005/0254662 A1* | 11/2005 | Blank et al. ..................... 381/58 |
| 2007/0250900 A1 | 10/2007 | Marcuvitz |
| 2008/0134043 A1 | 6/2008 | Georgis et al. |
| 2008/0192658 A1 | 8/2008 | Chiang et al. |
| 2009/0064268 A1 | 3/2009 | Straub et al. |
| 2009/0100495 A1 | 4/2009 | Manapragada et al. |
| 2009/0158330 A1 | 6/2009 | Song et al. |
| 2009/0205008 A1 | 8/2009 | Wollmershauser et al. |
| 2010/0303046 A1* | 12/2010 | Braithwaite et al. .......... 370/338 |
| 2011/0083155 A1 | 4/2011 | De Nijs et al. |
| 2012/0066711 A1* | 3/2012 | Evans et al. .................... 725/32 |

OTHER PUBLICATIONS

Bellusci, G. et al., "An Ultra-Wideband Positioning Demonstrator Using Audio Signals," 4th Workshop on Positioning, Navigation and Communication, Mar. 22, 2007, Hannover, Germany, pp. 71-76, available from <https://www2.spsc.tugraz.at/people/pedross/UWB4Audio/Bellusci07.pdf>, 6 pages.

Blank, Tom et al., "An Internet Protocol (IP) Sound System," 117th Audio Engineering Society Convention, Oct. 28-31, 2004, available from <http://research.microsoft.com/pubs/65146/aes2004.pdf>, 17 pages.

Kreiling, Janet, "I Want My IPTV," Packet, vol. 18, No. 3, pp. 32-36, Third Quarter 2006, copyright 2006, Cisco Systems, Inc., 71 pages.

* cited by examiner

HOME THEATER COMPONENT FOR A VIRTUALIZED HOME THEATER SYSTEM

RELATED APPLICATIONS

This application claims the benefit of provisional patent application Ser. No. 61/236,297, filed Aug. 24, 2009, the disclosure of which is hereby incorporated herein by reference in its entirety.

This application is related to commonly owned and assigned U.S. patent application Ser. No. 12/694,595, entitled VIRTUALIZED HOME THEATER SERVICE, which was filed concurrently herewith and which is hereby incorporated herein by reference in its entirety.

FIELD OF THE DISCLOSURE

The present disclosure relates to a Wide Area Network (WAN) based virtualized home theater system.

BACKGROUND

Existing home theaters are not easily reconfigurable or portable. As such, there is a need for a new home theater system that is both easily reconfigurable and portable.

SUMMARY OF THE DETAILED DESCRIPTION

The present disclosure relates to a Wide Area Network (WAN) based home theater system. In one embodiment, a home theater at a subscriber premises includes multiple home theater components, which include multiple audio playback components, such as speaker components, and a video playback component. Each home theater component is enabled to receive data from and send data to a virtualized home theater service via a WAN. In operation, the virtualized home theater service processes multimedia content to provide a separate content stream for each home theater component. In one embodiment, the separate media content streams for the home theater components are streamed to the home theater components via a layered multicast stream. The virtualized home theater service also provides absolute playback timestamps for the separate media content streams. Each home theater component receives the appropriate media content stream for the home theater component and provides playback of the media content stream according to the absolute playback timestamps for the media content stream. The absolute playback timestamps are preferably provided to substantially synchronize playback of the separate media content streams by the home theater components as well as to accommodate for network delays.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
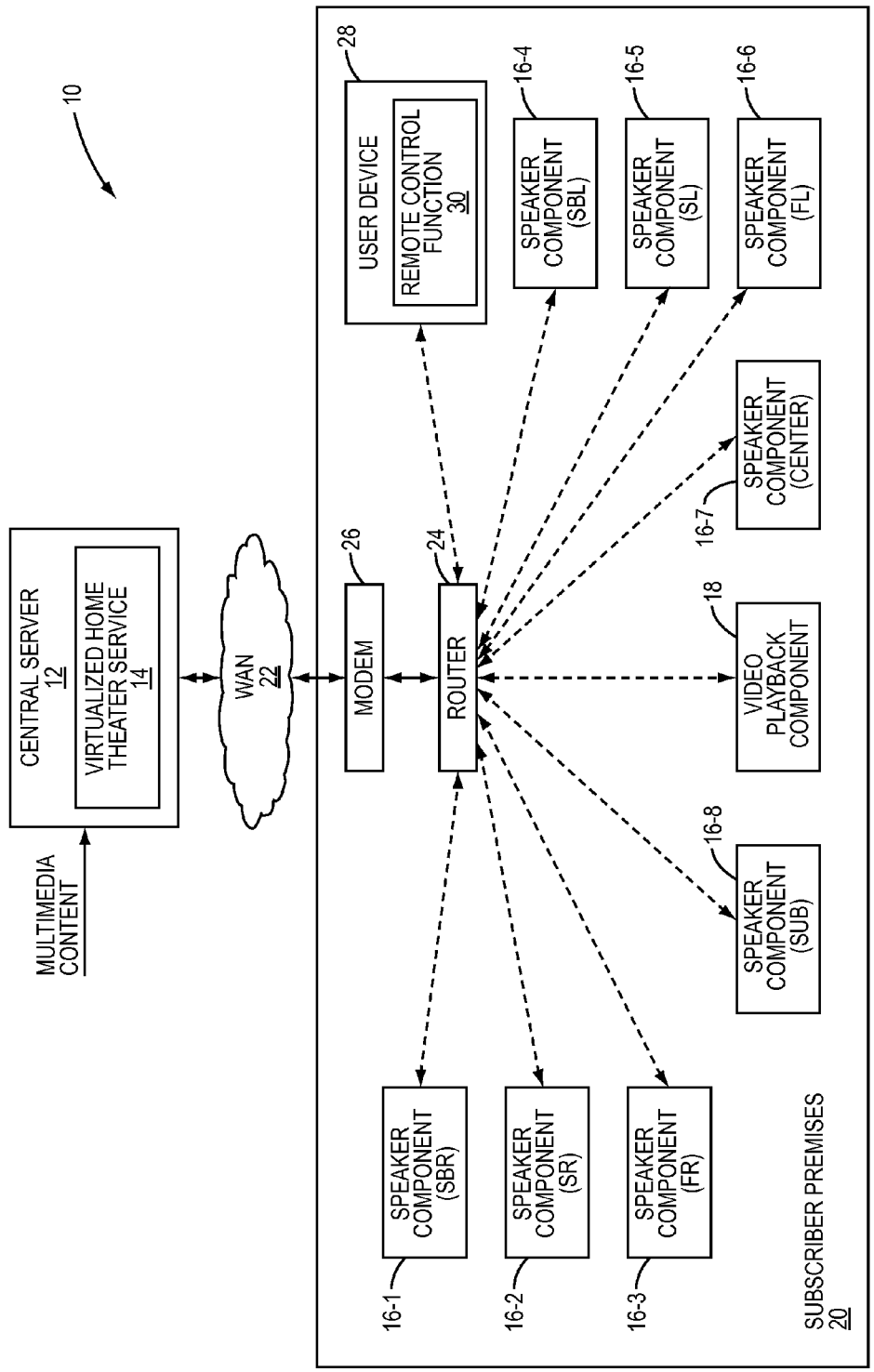
FIG. 1 is a block diagram of a Wide Area Network (WAN) based virtualized home theater system according to one embodiment of the present disclosure.

FIG. 1 illustrates a virtualized home theater system 10 according to one embodiment of the present disclosure. As illustrated, the virtualized home theater system 10 includes a central server 12 hosting a virtualized home theater service 14 that is connected to a number of speaker components 16-1 through 16-8 and a video playback component 18 forming a home theater at a subscriber premises 20 via a Wide Area Network (WAN) 22. Note that while this disclosure focuses on the speaker components 16-1 through 16-8, other types of audio playback components having the capabilities of the speaker components 16-1 through 16-8 described herein or having the speaker components 16-1 through 16-8 incorporated therein may be used. The subscriber premises 20 may be, for example, a user's home. While the system 10 of FIG. 1 illustrates only one subscriber premises 20 having one home theater, the virtualized home theater service 14 preferably serves numerous home theaters at numerous subscriber premises 20. Further, each subscriber premises 20 may include more than one home theater.

The central server 12 is a physical server connected to the WAN 22. Note that while the virtualized home theater service 14 is shown as being implemented on a single central server 12, the virtualized home theater service 14 may alternatively be implemented on a number of physical servers (e.g., a server farm) operating in a collaborative manner for load sharing and/or redundancy. However, in an alternate embodiment, the virtualized home theater service 14 is hosted by one or more network nodes within the WAN 22.

The virtualized home theater service 14 may be implemented in software, hardware, or a combination thereof. As discussed below in more detail, the virtualized home theater service 14 operates to process multimedia content requested by a user associated with the subscriber premises 20 to provide separate audio streams for the speaker components 16-1 through 16-8 and a video stream for the video playback component 18. In the preferred embodiment, the audio and video streams are provided to the speaker components 16-1 through 16-8 and the video playback component 18 via a layered multicast stream, where each layer of the multicast stream preferably provides the content stream for one of the speaker and video playback components 16-1 through 16-8 and 18. Further, in order to synchronize playback of the media content streams (i.e., the audio streams for the speaker components 16-1 through 16-8 and the video stream for the video playback component 18), the virtualized home theater service 14 provides absolute playback timestamps for the media content streams that define absolute times at which the media content streams are to be played at the speaker and video playback components 16-1 through 16-8 and 18. The absolute playback timestamps may also be referred to herein as actual-time-of-playback timestamps. The absolute playback timestamps also preferably account for network delays as well as internal delays of the speaker and video playback components 16-1 through 16-8 and 18. The absolute playback timestamps may be embedded within the media content streams or may be provided as metadata for the media content streams (e.g., in a metadata layer of a layered multicast stream).

In this embodiment, the speaker components 16-1 through 16-8 are arranged in a 7.1 surround sound configuration. As such, the speaker component 16-1 is arranged in the surround back-right (SBR) speaker position, the speaker component 16-2 is arranged in the surround right (SR) speaker position, the speaker component 16-3 is arranged in the front-right (FR) speaker position, the speaker component 16-4 is arranged in the surround back-left (SBL) speaker position, the speaker component 16-5 is arranged in the surround left (SL) speaker position, the speaker component 16-6 is arranged in the front-left (FL) speaker position, the speaker component 16-7 is the center channel (C), and the speaker component 16-8 is the sub-woofer. However, the present disclosure is not limited thereto. Other surround sound configurations may be used. Note that, for this disclosure, the speaker components 16-1 through 16-8 are generally referred herein to as speaker components 16. Also, the speaker components 16 and the video playback component 18 are more generally referred to herein as home theater components.

Each of the speaker components 16 and the video playback component 18 is Internet Protocol (IP) addressable, or IP enabled, and wirelessly connected to the WAN 22 via a wireless router 24 and a modem 26. As an example, the wireless router 24 may be an IEEE 802.11n wireless router, where each of the speaker components 16 and the video playback component 18 includes an IEEE 802.11n wireless interface for connecting to the wireless router 24. Note, however, that IEEE 802.11n is an example. Other wireless protocols having suitable bandwidth may be used. The modem 26 is preferably a Fiber-To-The-Home (FTTH) modem such that the subscriber premises 20 has a FTTH connection to the WAN 22. However, other types of modems having suitable bandwidth may be used.

In general, the speaker components 16 and the video playback component 18 operate to receive corresponding media content streams from the virtualized home theater service 14 for multimedia content to be presented via the home theater at the subscriber premises 20. The multimedia content may be, for example, a movie, a television program, or the like requested by a user associated with the subscriber premises 20. Upon receiving the media content streams, the speaker components 16 and the video playback component 18 provide playback of the appropriate media content streams according to absolute playback timestamps provided for the media content streams. As a result, playback of the media content streams at the speaker components 16 and the video playback component 18 is substantially synchronized.

In this embodiment, a user device 28 including a remote control function 30 is also located at the subscriber premises 20. The user device 28 may be, for example, a computer, a mobile smart phone, a remote control device, or similar device having local wireless capabilities. Using the remote control function 30, a user of the user device 28 can interact with the virtualized home theater service 14 to dynamically control playback of multimedia content. In addition, the remote control function 30 may enable the user of the user device 28 to register the home theater with the virtualized home theater service 14, set-up a theater template for the home theater, define one or more user profiles for users associated with the home theater, or the like. Note that the remote control function 30 may alternatively be incorporated with some other component of the virtualized home theater system 10 such as the video playback component 18.

Before proceeding, it should be noted that the virtualized home theater system 10 disclosed herein may provide numerous advantages over traditional home theater systems as will be appreciated by one of ordinary skill in the art. For example, using the virtualized home theater system 10, a user may easily reconfigure his home theater both in terms of physical layout and operation.

Figure 2:
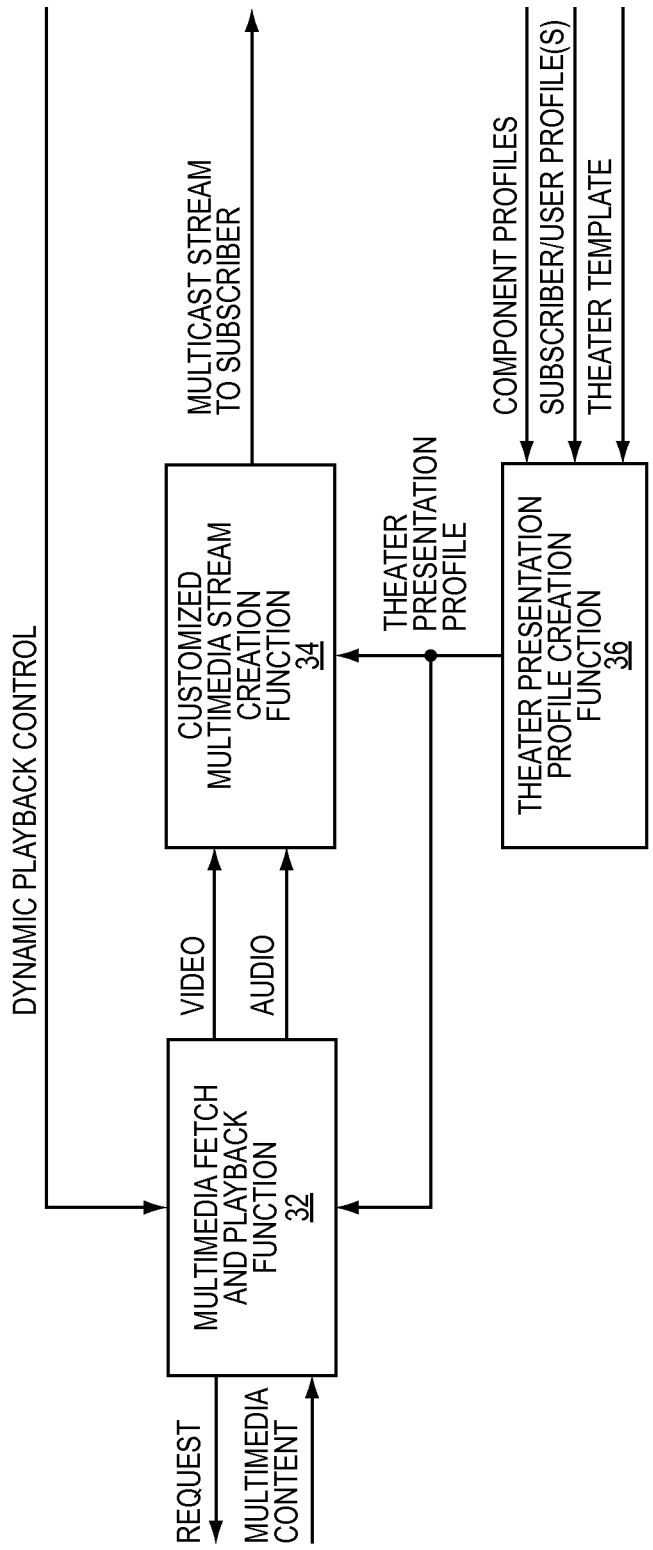
FIG. 2 is a functional block diagram of the virtualized home theater service of FIG. 1 according to one embodiment of the present disclosure.

FIG. 2 is a functional block diagram of the virtualized home theater service 14 of FIG. 1 according to one embodiment of the present disclosure. As illustrated, the virtualized home theater service 14 includes a multimedia fetch and playback function 32, a customized multimedia stream creation function 34, and a theater presentation profile creation function 36, each of which may be implemented in software, hardware, or a combination thereof. The multimedia fetch and playback function 32 generally operates to respond to a multimedia request received from the user of the user device 28 by obtaining the requested multimedia content and providing playback of the requested multimedia content under dynamic user control. Specifically, the multimedia fetch and playback function 32 processes both a video component of the multimedia content to provide a video stream destined for the video playback component 18 and an audio component of the multimedia content to provide audio streams for the speaker components 16.

The customized multimedia stream creation function 34 receives the video and audio streams as they are output by the multimedia fetch and playback function 32, inserts timestamps, and outputs a layered multicast stream that includes the video and audio streams and timestamps. The layered multicast stream may be provided using a technology such as IP multicast, Source-Specific Multicast (SSM), or the like. Note that the layered multicast stream is the preferred manner in which to deliver the audio and video streams to the speaker and video playback components 16 and 18 at the subscriber premises 20. However, the audio and video streams may be delivered using alternative distribution schemes such as, for example, separate unicast channels for each of the speaker and video playback components 16 and 18. As another alternative, packets for all of the speaker components 16 and optionally the video playback component 18 may be multiplexed on a single unicast channel along with their timestamps and destinations. A function in the modem 26 or the wireless router 24 may then process this unicast stream to either: (1) convert the unicast stream into an appropriate layered multicast stream to be delivered to the speaker components 16 and optionally the video playback component 18, (2) convert the unicast stream to a single multicast layer where the speaker components 16 and optionally the video playback component 18 process the single multicast layer to extract the appropriate packets, or (3) split the unicast stream including the multiplexed packets into separate unicast streams for the speaker components 16 and optionally the video playback component 18.

The timestamps inserted for the audio and video streams include absolute playback timestamps and, preferably, transmit timestamps. The absolute playback timestamps indicate absolute times of playback for corresponding points or segments of the audio and video streams. As described below in detail, the absolute playback timestamps are determined based on maximum network delays observed by the speaker and video playback components 16 and 18. In addition, the absolute playback timestamps may be further based on worst-case internal delays of the speaker and video playback components 16 and 18 and/or any additional delay requests received from the speaker and video playback components 16 and 18. The absolute playback timestamps enable the virtualized home theater service 14 to substantially synchronize playback of the audio and video streams at the speaker and video playback components 16 and 18 while at the same time accounting for network delays and worst-case internal delays of the speaker and video playback components 16 and 18. The transmit timestamps indicate times at which corresponding points or segments of the audio and video streams are transmitted by the virtualized home theater service 14. The absolute playback timestamps and the transmit timestamps may be embedded within the audio and video streams or provided as metadata for the audio and video streams. For example, in an embodiment where the audio and video streams are delivered using a layered multicast stream according to version six of the Internet Protocol (IPv6), the absolute playback timestamps and the transmit timestamps may be delivered in a metadata layer of the layered multicast stream.

The theater presentation profile creation function 36 creates a theater presentation profile for the home theater formed by the speaker and video playback components 16 and 18 at the subscriber premises 20. The theater presentation profile includes component profiles, or component data, for the speaker and video playback components 16 and 18. Using the speaker component 16 as an example, the component profile for the speaker component 16 includes a maximum network delay observed by the speaker component 16 for data received from the virtualized home theater service 14. In addition, the component data for the speaker component 16 may include a worst-case internal delay of the speaker component 16, any additional delay requested by the speaker component 16 as a result of circumstances occurring at the speaker component 16, or both. Still further, the component profile may include data about characteristics and capabilities of the speaker component 16. In a similar manner, the component profile for the video playback component 18 includes a maximum network delay observed by the video playback component 18 for data transmitted by the virtualized home theater service 14. In addition, the component profile for the video playback component 18 may include a worst-case internal delay of the video playback component 18, any additional delay requested by the video playback component 18 resulting from circumstances occurring at the video playback component 18, and/or data about other characteristics and capabilities of the video playback component 18 such as, for example, video formats playable by the video playback component 18 (e.g., H.264 and MPEG2), a screen size (e.g., 53 inch widescreen), or the like.

In addition, the theater presentation profile may include user profiles, or user data, regarding one or more users that utilize the home theater at the subscriber premises 20. The user profiles may include any information regarding the corresponding users that is relevant to processing of multimedia content to be streamed to the speaker and/or video playback components 16 and 18. For example, the user profiles may include the ages of one or more users. Because older persons typically cannot hear higher frequencies as well as younger persons, the multimedia fetch and playback function 32 may then perform a specialized equalization process to boost higher frequencies if the user(s) at the subscriber premises 20 are older than a predefined threshold age. Still further, the theater presentation profile may include a theater template for the home theater formed by the speaker and video playback components 16 and 18 at the subscriber premises 20. The theater template includes data that, for example, identifies the relative positions of the speaker and/or video playback components 16 and 18 within the subscriber premises 20, defines audio channels for the speaker components 16 (e.g., speaker component 16-1 is the sound back-right channel in a 7.1 surround sound configuration), or the like.

Using the theater presentation profile, the multimedia fetch and playback function 32 is enabled to customize the audio and video streams for the speaker and video playback components 16 and 18 and/or the users at the subscriber premises 20. In addition, using maximum network delays and, optionally, the worst-case internal delays of the speaker and video playback components 16 and 18 and/or any additional delay requests made by the speaker and video playback components 16 and 18, the customized multimedia stream creation function 34 is enabled to calculate the absolute playback timestamps for the audio and video streams.

Figure 3:
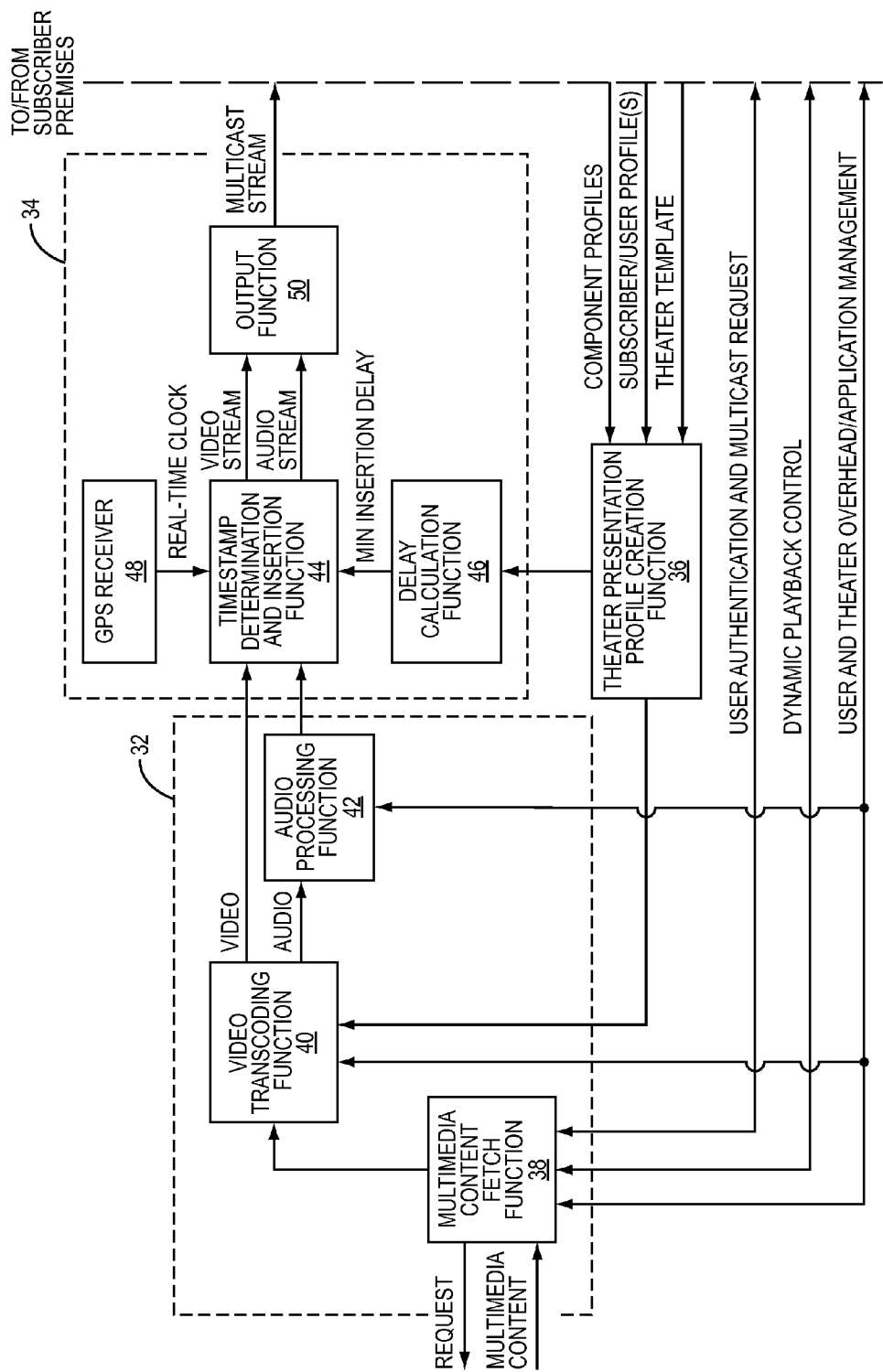
FIG. 3 is a more detailed functional block diagram of the virtualized home theater service of FIG. 1 according to one embodiment of the present disclosure.

FIG. 3 is a more detailed functional block diagram of the virtualized home theater service 14 according to one embodiment of the present disclosure. As illustrated, in this embodiment, the multimedia fetch and playback function 32 includes a multimedia content fetch function 38, a video transcoding function 40, and an audio processing function 42. The multimedia content fetch function 38 operates to process multimedia requests. In addition, the multimedia content fetch function 38 processes dynamic playback control requests such as rewind, fast-forward, and pause requests. In one embodiment, the multimedia requests and dynamic playback control requests are received from the user of the user device 28 (FIG. 1) via the remote control function 30. In addition, the multimedia content fetch function 38 may perform user authentication such as, for example, requiring the user of the user device 28 to enter a username and password before starting a new playback session. The multimedia content fetch function 38 may also process additional user and theater overhead and application management requests. For example, the virtualized home theater service 14 may enable a picture-in-picture feature where the user and theater overhead and application management request exchanges are used to setup the picture-in-picture feature. For instance, an additional content request for content for the picture-in-picture feature and video transcoding may be needed to provide the picture-in-picture feature. For audio, the user and theater overhead and application management requests may enable specialized equalization such as, for example, boosting higher frequencies if an older person(s) is at the subscriber premises 20.

In operation, the multimedia content fetch function 38 obtains multimedia content requested by the user of the user device 28 via the remote control function 30. The multimedia content fetch function 38 may obtain the multimedia content from a live stream of multimedia content over a unicast, multicast, or broadcast connection. Alternatively, the multimedia content fetch function 38 may obtain the multimedia content from either local or remote storage. Note, however, that other content delivery network (CDN) processes, protocols, or services may be used to obtain the multimedia content. The multimedia content fetch function 38 obtains and outputs the multimedia content under dynamic user control and, optionally, theater specific application data.

As the multimedia content is obtained and output by the multimedia content fetch function 38, the video transcoding function 40 operates to process a video content of the multimedia content to output a video stream for the video playback component 18 (FIG. 1). If needed, the video transcoding function 40 may convert the video content from one format (e.g., MPEG2) to another desired format (e.g., H.264) in order to meet playback requirements of the video playback component 18 at the subscriber premises 20. The video transcoding function 40 may also provide other specialized features such as, for example, providing a picture-in-picture window within the video stream, providing image enhancements such as resizing the video content to fit a display of or associated with the video playback component 18 (e.g., converting from 4:3 to 16:9 format) or converting to grayscale, or the like. Note that specific information or instructions as to how the video content is to be transcoded is preferably provided in or determined from the theater presentation profile for the home theater at the subscriber premises 20.

In addition, the video transcoding function 40 provides available audio channels of the multimedia content to the audio processing function 42. The audio processing function 42 processes the audio content in the available audio channels to provide audio content streams for the speaker components 16 (FIG. 1). In one embodiment, the audio content in the available audio channels is encoded, and the audio processing function 42 decodes the audio content to provide the audio content streams for the speaker components 16 in a RAW format (i.e., an uncompressed or lossless format). The audio processing function 42 may also provide specialized audio processing. For example, if the audio content of the multimedia content includes only two stereo channels, the audio processing function 42 may process the two stereo channels to increase the number of audio channels using a virtual surround sound processing technique. As another example, as discussed below, one or more of the speaker components 16 may include multiple speakers (e.g., tweeter, mid-range, and woofer). For each of those speaker components 16, the audio processing function 42 may process the audio channel for the speaker component 16 using a cross-over function (e.g., cross-over filtering) to provide separate audio streams for the multiple speakers enclosed within the speaker component 16. As a final example, the audio processing function 42 may provide specialized equalization such as, for instance, boosting high frequency components of the audio streams for the speaker components 16 because one or more users at the subscriber premises 20 are older. Note that the specialized audio processing features described above are exemplary. In general, any type of desired audio processing may be performed in order to provide customized audio streams for the speaker components 16 of the home theater at the subscriber premises 20.

As the video transcoding function 40 and the audio processing function 42 output the audio and video streams for the speaker and video playback components 16 and 18, the customized multimedia stream creation function 34 calculates and inserts timestamps for the audio and video streams and formats the audio and video streams and timestamps into a layered multicast stream. In the preferred embodiment, each of the audio and video streams is provided via a separate layer of the layered multicast stream. However, the present disclosure is not limited thereto. The timestamps may be embedded within the audio and video streams or provided separately in a metadata layer of the layered multicast stream. The timestamps include absolute playback timestamps that define absolute playback times for corresponding points or segments in the audio and video streams. In addition, the timestamps preferably include transmit timestamps defining times at which corresponding points or segments of the audio and video streams are transmitted by the virtualized home theater service 14.

A timestamp determination and insertion function 44 determines the absolute playback timestamps based on the maximum network delays reported by the speaker components 16 and the video playback component 18 and, optionally, the worst-case internal delays reported by the speaker components 16 and the video playback component 18 and/or any additional delay requests received from the speaker components 16 and the video playback component 18. More specifically, each of the speaker components 16 determines a maximum network delay observed by the speaker component 16 for data received from the virtualized home theater service 14 and reports the maximum network delay to the virtualized home theater service 14. In addition, each speaker component 16 may report a worst-case internal delay of the speaker component 16. Likewise, the video playback component 18 determines a maximum network delay observed by the speaker component 16 for data received from the virtualized home theater service 14 and reports the maximum network delay to the virtualized home theater service 14. In addition, the video playback component 18 may report a worst-case internal delay of the video playback component 18. If needed, the speaker and video playback components 16 and 18 may request additional amounts of delay.

Using the maximum network delays and, optionally, the worst-case internal delays and/or additional delay requests of the speaker components 16 and the video playback component 18, a delay calculation function 46 calculates a maximum total delay. In this embodiment, the maximum network delays, worst-case internal delays, and any additional delay requests are included in the theater presentation profile provided to the delay calculation function 46. More specifically, in this embodiment, for each of the home theater components (i.e., each of the audio and video playback components 16 and 18), the delay calculation function 46 calculates a total delay for the home theater component as a sum of the maximum network delay for that home theater component, the worst-case internal delay of that home theater component, and any additional delays requested by that home theater component. The delay calculation function 46 then determines the largest total delay among the total delays calculated for the speaker and video playback components 16 and 18 and provides the largest total delay to the timestamp determination and insertion function 44 as a minimum insertion delay. Note that, in an alternative embodiment, only the video playback component 18 may report its maximum network delay and worst-case internal delay in order to reduce complexity. In this alternative embodiment, the delay calculation function 46 sums the network delay of the video playback component 18, the worst-case internal delay of the video playback component 18, and any additional delays requested to provide the maximum total delay.

Then, as the audio and video streams are received, the timestamp determination and insertion function 44 obtains a real-time clock from an accurate source, which in this example is a Global Positioning System (GPS) receiver 48. As will be appreciated by one having ordinary skill in the art, the GPS receiver 48 provides a real-time clock with an accuracy of less than 0.3 microseconds when locked to just a single satellite. Note, however, that other accurate real-time clocks may be used and synchronized with accurate real-time clocks at the speaker and video playback components 16 and 18 using any known clock synchronization technique. Based on the real-time clock, the timestamp determination and insertion function 44 periodically inserts the current time as the transmit timestamp defining the time of transmission for each of the audio and video streams.

In addition, the timestamp determination and insertion function 44 periodically inserts an absolute playback timestamp for each of the audio and video streams, where the absolute playback timestamp is the current time plus an amount of time that is greater than or equal to the minimum insertion delay provided by the delay calculation function 46. By defining the absolute playback timestamps as such, the timestamp determination and insertion function 44 ensures that the audio and video streams have sufficient time to be delivered to the speaker and video playback components 16 and 18 via the WAN 22 (FIG. 1) and processed by the speaker and video playback components 16 and 18 before the absolute time for playback. Further, using the absolute playback times in combination with accurate clock sources at the speaker and video playback components 16 and 18 that are sufficiently synchronized with the real-time clock of the virtualized home theater service 14, playback of the audio and video streams is substantially synchronized at the speaker and video playback components 16 and 18 in the home theater of the subscriber premises 20. It should be further noted that the absolute playback times of the audio streams may be further provided in such a manner as to compensate for phase differences due to the relative positions of the speaker components 16 with respect to a reference point (e.g., ideal seating position of a user in the subscriber premises 20). In other words, the absolute playback timestamps for the speaker components 16 may also be adjusted with respect to one another to provide acoustic calibration for the home theater.

It should be noted that many audio/video (A/V) formats include timestamps of their own. However, these timestamps are relative timestamps and are not absolute. For example, MPEG-2 packets may include reference timestamps, Decode Time Stamps (DTSs), and Presentation Time Stamps (PTS). As such, in an alternative embodiment, the timestamp determination and insertion function 44 may modify these existing timestamps to contain the absolute playback timestamps. Also, in a situation where existing timestamps in the A/V content are absolute timestamps, the timestamp determination and insertion function 44 may modify these existing timestamps to incorporate the absolute playback timestamps in addition to or as an alternative to including the absolute playback timestamps in the metadata associated with the audio and video streams.

As the audio and video streams are received and processed by the timestamp determination and insertion function 44, the audio and video streams and corresponding absolute playback and transmit timestamps are output from the timestamp determination and insertion function 44 to an output function 50. The video stream output by the timestamp determination and insertion function 44 is preferably, but not necessarily, compressed. The audio streams output by the timestamp determination and insertion function 44 are preferably, but not necessarily, in a RAW format. The output function 50 generally operates to format the audio and video streams into a layered multicast stream. Preferably, each of the audio and video streams is provided as a separate layer in the layered multicast stream. In addition, the output function 50 may provide encryption of the audio and video streams if desired. The layered multicast stream is multicast on a multicast channel that has preferably been assigned to the home theater formed by the speaker and video playback components 16 and 18 at the subscriber premises 20. Note that reliable multicast techniques such as, for example, Scalable Reliable Multicast, Pragmatic General Multicast (PGM), or Forward Error Correction (FEC) may also be used to recover from any packet loss. If a reliable multicast technique is used, FEC is preferred because it entails zero additional latency to recover from packet loss.

Before proceeding, regarding transcoding, transcoding often involves decoding from one format and encoding into another format, which usually entails adjusting the timestamps that may be contained in the formats. This may be needed to account for changes in bitrate, picture formats, etc. and is true for many formats that contain timestamps, such as MPEG-2 and H.264. Thus, in an alternative embodiment, the video transcoding function 40 may only perform decoding to frames of a raw or intermediate format. These frames would then be assigned timestamps by the timestamp determination and insertion function 44. The output function 50 may then also perform an encoding operation to convert the frames into a desired final, or output, format. Thus, in general, the transcoding operation may be spread across the video transcoding function 40 and the output function 50, with the timestamp determination and insertion function 44 doing timestamp manipulation between them.

Figure 4:
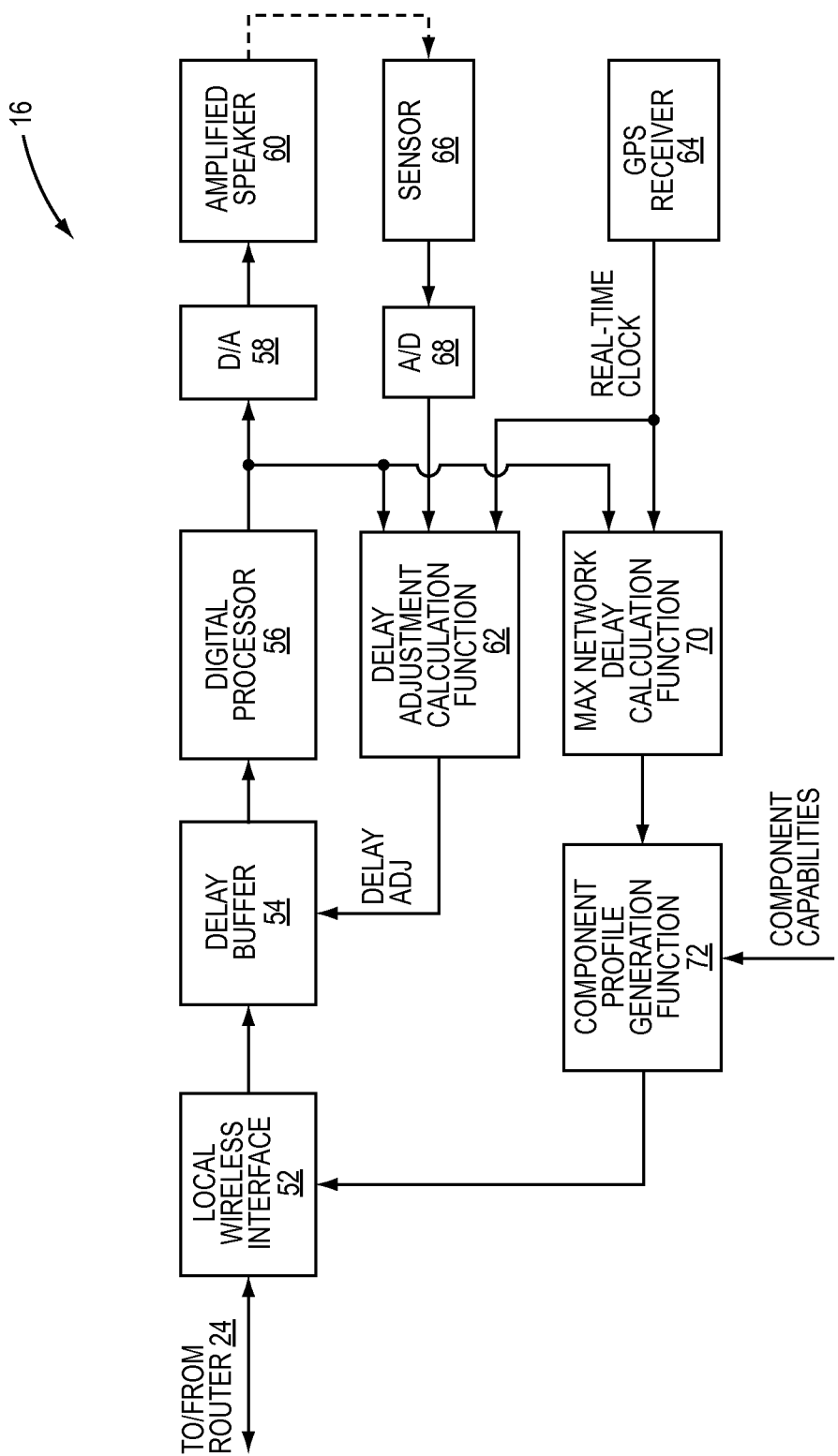
FIG. 4 is a block diagram of one of the speaker components of FIG. 1 according to one embodiment of the present disclosure.

FIG. 4 is a block diagram of the speaker component 16 of FIG. 1 according to one embodiment of the present disclosure. As illustrated, the speaker component 16 includes a local wireless interface 52, a delay buffer 54, a digital processor 56, a Digital-to-Analog (D/A) converter 58, and an amplified speaker 60. The local wireless interface 52 is a physical component that is implemented in hardware. Note, however, that software may reside within and be executed by a processor within the local wireless interface 52. The local wireless interface 52 preferably operates according to the IEEE 802.11n standard. However, the local wireless interface 52 may alternatively operate according to any local wireless communication standard having bandwidth suitable for transferring the required audio stream. Note that while the local wireless interface 52 is preferred, in an alternative embodiment, a wired network interface, such as an Ethernet interface, may be used.

In operation, the local wireless interface 52 receives a layered multicast stream from the virtualized home theater service 14 for multimedia content desired to be presented by the home theater in the subscriber premises 20 (FIG. 1). As the layered multicast stream is received, the local wireless interface 52 extracts an audio stream destined for the speaker component 16 from the layered multicast stream and outputs the audio stream to the delay buffer 54. Note that, as discussed above, the layered multicast stream is the preferred manner in which to deliver the audio and video streams for the desired multimedia content to the speaker and video playback components 16 and 18. However, the present disclosure is not limited thereto. For example, separate unicast streams may alternatively be used to deliver the audio and video streams to the speaker and video playback components 16 and 18. Further, the audio stream is preferably, but not necessarily, received in a RAW, or lossless/uncompressed, format to avoid any re-compression quality degradation.

The delay buffer 54 is, or at least includes, physical memory such as, but not limited to, Random Access Memory (RAM), Flash memory, or the like. As the local wireless interface 52 outputs the audio stream for the speaker component 16, the delay buffer 54 buffers the audio stream under the control of a delay adjustment control input in order to output a delayed audio stream. The delayed audio stream is delayed with respect to the audio stream input to the delay buffer 54 by an amount of time defined by the delay adjustment control input. As discussed below, using the delay adjustment control input, playback of the audio stream at the amplified speaker 60 is synchronized, or at least substantially synchronized, with the absolute playback timestamps for the audio stream.

As the delayed audio stream is output by the delay buffer 54, the digital processor 56 processes the delayed audio stream to perform any desired specialized processing and, if needed, decoding of the audio stream. Note that the digital processor 56 may not be needed if the audio stream is in a RAW format and no specialized audio processing is desired. With regards to specialized processing, if, for example, the speaker component 16 were to have multiple amplified speakers (e.g., a tweeter, a mid-range, and a woofer), the digital processor 56 may perform a cross-over function in order to provide separate audio streams for the multiple amplified speakers. As the processed and delayed audio stream is output by the digital processor 56, in this embodiment, the D/A converter 58 converts the processed and delayed audio stream to an analog signal that is used to drive the amplified speaker 60.

The speaker component 16 also includes a delay adjustment calculation function 62 that operates to provide the delay adjustment control input to the delay buffer 54. More specifically, in this embodiment, the delay adjustment calculation function 62 obtains an absolute playback timestamp for the processed and delayed audio stream from the digital processor 56. The delay adjustment calculation function 62 then calculates a delta value for the delay adjustment control input based on a difference between the absolute playback time defined by the absolute playback timestamp and a current time provided by an accurate real-time clock. In addition, the delay adjustment calculation function 62 may consider an output delay resulting from the D/A converter 58 and the amplified speaker 60. Thus, in this embodiment, the delay adjustment calculation function 62 calculates the delta value for the delay adjustment control input based on the following equation:

$$\Delta DelayAdjustment = AbsolutePlaybackTime - CurrentTime + OutputDelay,$$

where $\Delta DelayAdjustment$ is the delta value for the delay adjustment control input, AbsolutePlaybackTime is the absolute playback time for the audio stream defined by the absolute playback timestamp, CurrentTime is the current time obtained from the accurate real-time clock, and OutputDelay is a delay resulting from the D/A converter 58 and the amplified speaker 60. The delay adjustment calculation function 62 then adjusts the delay adjustment control input according to the calculated delta value, $\Delta DelayAdjustment$. The delay adjustment calculation function 62 preferably repeats this process for each absolute playback timestamp or at least a subset of the absolute playback timestamps in order to update the delay adjustment control input over time as the audio stream is received.

In this embodiment, the accurate real-time clock is provided by a GPS receiver 64. However, the present disclosure is not limited thereto. In general, the purpose of the accurate real-time clock is to provide a real-time clock that is substantially synchronized with real-time clocks of the virtualized home theater service 14, the other speaker components 16, and the video playback component 18. However, while GPS receivers, such as the GPS receiver 64, are used in the preferred embodiment, any technique for providing synchronized real-time clocks at the virtualized home theater service 14 and the speaker and video playback components 16 and 18 may alternatively be used.

Further, in this embodiment, the output delay, OutputDelay, is determined by the delay adjustment calculation function 62 by comparing the processed and delayed audio stream to a feedback signal provided by a sensor 66 and Analog-to-Digital (A/D) converter 68. For example, the comparison may be performed using a Digital Signal Processing (DSP) technique such as, for example, cross-correlation. In this embodiment, the sensor 66 is a microphone that captures sound output by the amplified speaker 60. The output of the sensor 66 is digitized by the ND converter 68 and then compared to a buffered version of the processed and delayed audio stream in order to determine the delay between the output of the digital processor 56 and the output of the amplified speaker 60, which is the output delay.

The speaker component 16 also includes a maximum network delay calculation function 70 that operates to calculate the maximum network delay observed by the speaker component 16 for data received from the virtualized home theater service 14. In operation, as the processed and delayed audio stream is output by the digital processor 56, the maximum network delay calculation function 70 obtains a transmit timestamp for the processed and delayed audio stream. The maximum network delay calculation function 70 then determines the maximum network delay for the speaker component 16 by comparing the transmit time defined by the transmit timestamp to the current time provided by the real-time clock of the speaker component 16. Again, in this embodiment, the real-time clock is provided by the GPS receiver 64. More specifically, the maximum network delay calculation function 70 determines a difference between the current time and the transmit time. Optionally, the delay of the delay buffer 54 may be added back into the difference because the delay of the delay buffer 54 is not actually part of the network delay. The difference is then compared to the previous maximum network delay for the speaker component 16, if any. If the difference is greater than the previous maximum network delay, then the difference is stored as the new maximum network delay. This process is preferably repeated over time for each transmit timestamp for the audio stream or for a subset of the transmit timestamps for the audio stream.

Note that the maximum network delay may timeout after a predefined amount of time. For instance, in one embodiment, the maximum network delay calculation function 70 may store the differences between the transmit time and the current time for each of a number of timestamps. The number of timestamps may be a number of timestamps for data received from the virtualized home theater service 14 over a defined amount of time or the last N timestamps, where N is a defined integer greater than 1. The largest stored difference value may then be selected as the maximum network delay for the speaker component 16.

Lastly, the speaker component 16 includes a component profile generation function 72 that operates to generate the component profile for the speaker component 16 and to provide the component profile for the speaker component 16 to the virtualized home theater service 14. The component profile includes the maximum network delay of the speaker component 16 as calculated by the maximum network delay calculation function 70. In addition, the component profile may include a worst-case internal delay of the speaker component 16, which is preferably a predefined value programmed into or otherwise obtained by the speaker component 16. Still further, the component profile may include data regarding capabilities of the speaker component 16. In the preferred embodiment, the component profile generation function 72 provides the component profile to the virtualized home theater service 14 and thereafter provides updates for the component profile to the virtualized home theater service 14 as needed.

Figure 5:
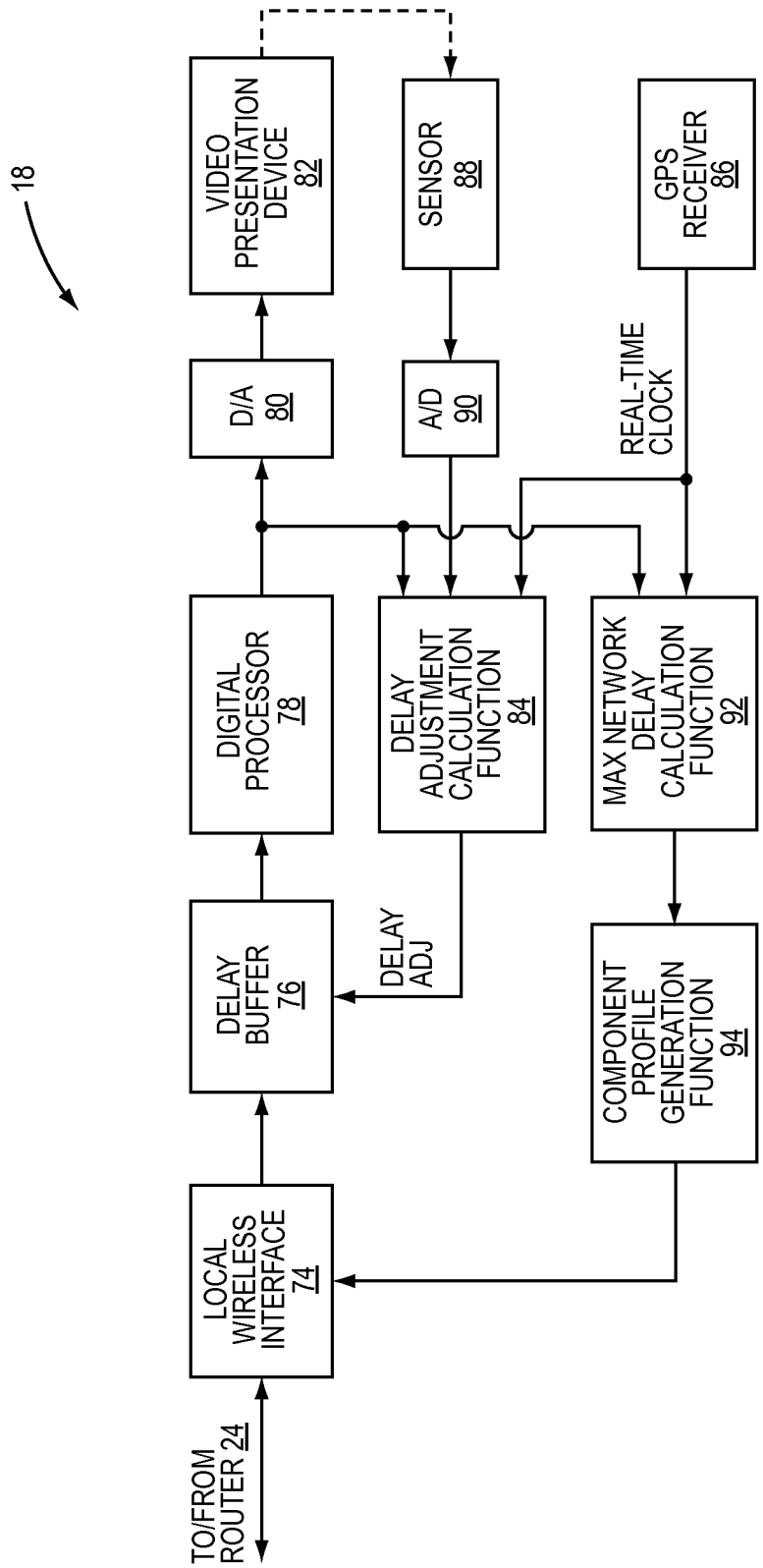
FIG. 5 is a block diagram of the video playback component of FIG. 1 according to one embodiment of the present disclosure.

FIG. 5 is a block diagram of the video playback component 18 of FIG. 1 according to one embodiment of the present disclosure. As illustrated, the video playback component 18 includes a local wireless interface 74, a delay buffer 76, a digital processor 78, a D/A converter 80, and a video presentation device 82 such as, for example, a display. The local wireless interface 74 is a physical component that is implemented in hardware. Note, however, that software may reside within and be executed by a processor within the local wireless interface 74. The local wireless interface 74 preferably operates according to the IEEE 802.11n standard. However, the local wireless interface 74 may alternatively operate according to any local wireless communication standard having bandwidth suitable for transferring the required audio stream. Note that while the local wireless interface 74 is preferred, in an alternative embodiment, a wired network interface, such as an Ethernet interface, may be used.

In operation, the local wireless interface 74 receives a layered multicast stream from the virtualized home theater service 14 for multimedia content desired to be presented by the home theater in the subscriber premises 20 (FIG. 1). As the layered multicast stream is received, the local wireless interface 74 extracts the video stream destined for the video playback component 18 from the layered multicast stream and outputs the video stream to the delay buffer 76. Note that, as discussed above, the layered multicast stream is the preferred manner in which to deliver the audio and video streams for the desired multimedia content to the speaker and video playback components 16 and 18. However, the present disclosure is not limited thereto. For example, separate unicast streams may alternatively be used to deliver the audio and video streams to the speaker and video playback components 16 and 18. Further, the video stream is preferably, but not necessarily, received in a compressed format.

The delay buffer 76 is, or at least includes, physical memory such as, but not limited to, RAM, Flash memory, or the like. As the local wireless interface 74 outputs the video stream for the video playback component 18, the delay buffer 76 buffers the video stream under the control of a delay adjustment control input in order to output a delayed video stream. The delayed video stream is delayed with respect to the video stream input to the delay buffer 76 by an amount of time defined by the delay adjustment control input. As discussed below, using the delay adjustment control input, playback of the video stream at the video presentation device 82 is synchronized, or at least substantially synchronized, with the absolute playback timestamps for the video stream.

As the delayed video stream is output by the delay buffer 76, the digital processor 78 processes the delayed video stream to decode the video stream as well as perform any desired specialized processing. As the processed and delayed video stream is output by the digital processor 78, in this embodiment, the D/A converter 80 converts the processed and delayed video stream to an analog signal that is provided to the video presentation device 82. Alternatively, a digital interface may be provided between the digital processor 78 and the video presentation device 82 in which case the D/A converter 80 would not be needed.

The video playback component 18 also includes a delay adjustment calculation function 84 that operates to provide the delay adjustment control input to the delay buffer 76. More specifically, in this embodiment, the delay adjustment calculation function 84 obtains an absolute playback timestamp for the processed and delayed video stream from the digital processor 78. The delay adjustment calculation function 84 then calculates a delta value for the delay adjustment control input based on a difference between the absolute playback time defined by the absolute playback timestamp and a current time provided by an accurate real-time clock. In addition, the delay adjustment calculation function 84 may consider an output delay resulting from the D/A converter 80 and the video presentation device 82. Thus, in this embodiment, the delay adjustment calculation function 84 calculates the delta value for the delay adjustment control input based on the following equation:

$$\Delta \text{DelayAdjustment} = \text{AbsolutePlaybackTime} - \text{CurrentTime} + \text{OutputDelay},$$

where $\Delta$DelayAdjustment is the delta value for the delay adjustment control input, AbsolutePlaybackTime is the absolute playback time for the video stream defined by the absolute playback timestamp, CurrentTime is the current time obtained from the accurate real-time clock, and OutputDelay is a delay resulting from the D/A converter 80 and the video presentation device 82. The delay adjustment calculation function 84 then adjusts the delay adjustment control input according to the calculated delta value, $\Delta$DelayAdjustment. The delay adjustment calculation function 84 preferably repeats this process for each absolute playback timestamp or at least a subset of the absolute playback timestamps in order to update the delay adjustment control input over time as the video stream is received.

In this embodiment, the accurate real-time clock is provided by a GPS receiver 86. However, the present disclosure is not limited thereto. In general, the purpose of the accurate real-time clock is to provide a real-time clock that is substantially synchronized with real-time clocks of the virtualized home theater service 14 and the speaker components 16. However, while GPS receivers, such as the GPS receiver 86, are used in the preferred embodiment, any technique for providing synchronized real-time clocks at the virtualized home theater service 14 and the speaker and video playback components 16 and 18 may alternatively be used.

Further, in this embodiment, the output delay, OutputDelay, is determined by the delay adjustment calculation function 84 by comparing the processed and delayed video stream to a feedback signal provided by a sensor 88 and an A/D converter 90. For example, the comparison may be performed using a DSP technique such as, for example, cross-correlation. However, for comparing frames of video (which can be treated as images), more specialized techniques may be used such as, for example, Fast Normalized Cross-Correlation. Further, to reduce processing requirements, image processing such as re-sizing, converting to grayscale, or the like may be performed. In this embodiment, the sensor 88 is a video capture device, such as a camera, that captures the video output by the video presentation device 82. The output of the sensor 88 is digitized by the ND converter 90 and then compared to a buffered version of the processed and delayed video stream in order to determine the delay between the output of the digital processor 78 and the output of the video presentation device 82, which is the output delay.

The video playback component 18 also includes a maximum network delay calculation function 92 that operates to calculate the maximum network delay observed by the video playback component 18 for data received from the virtualized home theater service 14. In operation, as the processed and delayed video stream is output by the digital processor 78, the maximum network delay calculation function 92 obtains a transmit timestamp for the processed and delayed video stream. The maximum network delay calculation function 92 then determines the maximum network delay for the video playback component 18 by comparing the transmit time defined by the transmit timestamp to the current time provided by the real-time clock of the video playback component 18. Again, in this embodiment, the real-time clock is provided by the GPS receiver 86. More specifically, the maximum network delay calculation function 92 determines a difference between the current time and the transmit time. Optionally, the delay of the delay buffer 76 may be added back into the difference because the delay of the delay buffer 76 is not actually part of the network delay. The difference is then compared to the previous maximum network delay for the video playback component 18, if any. If the difference is greater than the previous maximum network delay, then the difference is stored as the new maximum network delay. This process is preferably repeated over time for each transmit timestamp for the video stream or for a subset of the transmit timestamps for the video stream.

Note that the maximum network delay may timeout after a predefined amount of time. For instance, in one embodiment, the maximum network delay calculation function 92 may store the difference between the transmit time and the current time for each of a number of timestamps. The number of timestamps may be a number of timestamps for data received from the virtualized home theater service 14 over a defined amount of time or the last N timestamps, where N is a defined integer greater than 1. The largest stored difference value may then be selected as the maximum network delay for the video playback component 18.

Lastly, the video playback component 18 includes a component profile generation function 94 that operates to generate the component profile for the video playback component 18 and provide the component profile for the video playback component 18 to the virtualized home theater service 14. The component profile includes the maximum network delay of the video playback component 18 as calculated by the maximum network delay calculation function 92. In addition, the component profile may include a worst-case internal delay of the video playback component 18, which is preferably a predefined value programmed into or otherwise obtained by the video playback component 18. Still further, the component profile may include data regarding capabilities of the video playback component 18 such as, for example, compatible video formats, screen size, or the like. In the preferred embodiment, the component profile generation function 94 provides the component profile to the virtualized home theater service 14 and thereafter provides updates for the component profile to the virtualized home theater service 14 as needed.

Before proceeding, it should be noted that synchronization of the real-time clocks of the virtualized home theater service 14, the speaker components 16, and the video playback component 18 is required for synchronous playback of the audio and video streams by the speaker and video playback components 16 and 18 according to the absolute playback timestamps. In the preferred embodiment, an audio to video offset between playback of the audio streams by the speaker components 16 and playback of the video stream by the video playback component 18 is less than 10 milliseconds (ms) such that lip synchronization issues are avoided. In addition, an inter-channel phase delay, which can be defined as the difference in group delay between the audio streams played by the speaker components 16, is preferably under one percent. This requires increased real-time clock accuracy as audio frequency increases. For instance, a one percent inter-channel phase delay requires 0.5 microsecond accuracy at 20 kilo-Hertz (kHz), 0.6 microsecond accuracy at 15 kHz, and 1 microsecond accuracy at 10 kHz. The GPS receivers 48, 64, and 86 of the virtualized home theater service 14 and the speaker and video playback components 16 and 18, respectively, can provide synchronous real-time clocks having 0.3 microsecond accuracy when locked to just a single satellite. Thus, in the preferred embodiment, the virtualized home theater service 14, the speaker components 16, and the video playback component 18 include the GPS receivers 48, 64, and 86, respectively, in order to provide accurate and substantially synchronized real-time clocks. However, other techniques for providing synchronization between real-time clocks at the virtualized home theater service 14, the speaker components 16, and the video playback component 18 having suitable accuracy may be used. For instance, only one home theater component 16/18 may have a GPS receiver clock, but the other home theater components 16/18 can calculate a reasonably accurate absolute time using time synchronization methods within the local network such as, for example, Reference Broadcast Time Synchronization for Flooding Time Synchronization Protocol.

Figure 6A:
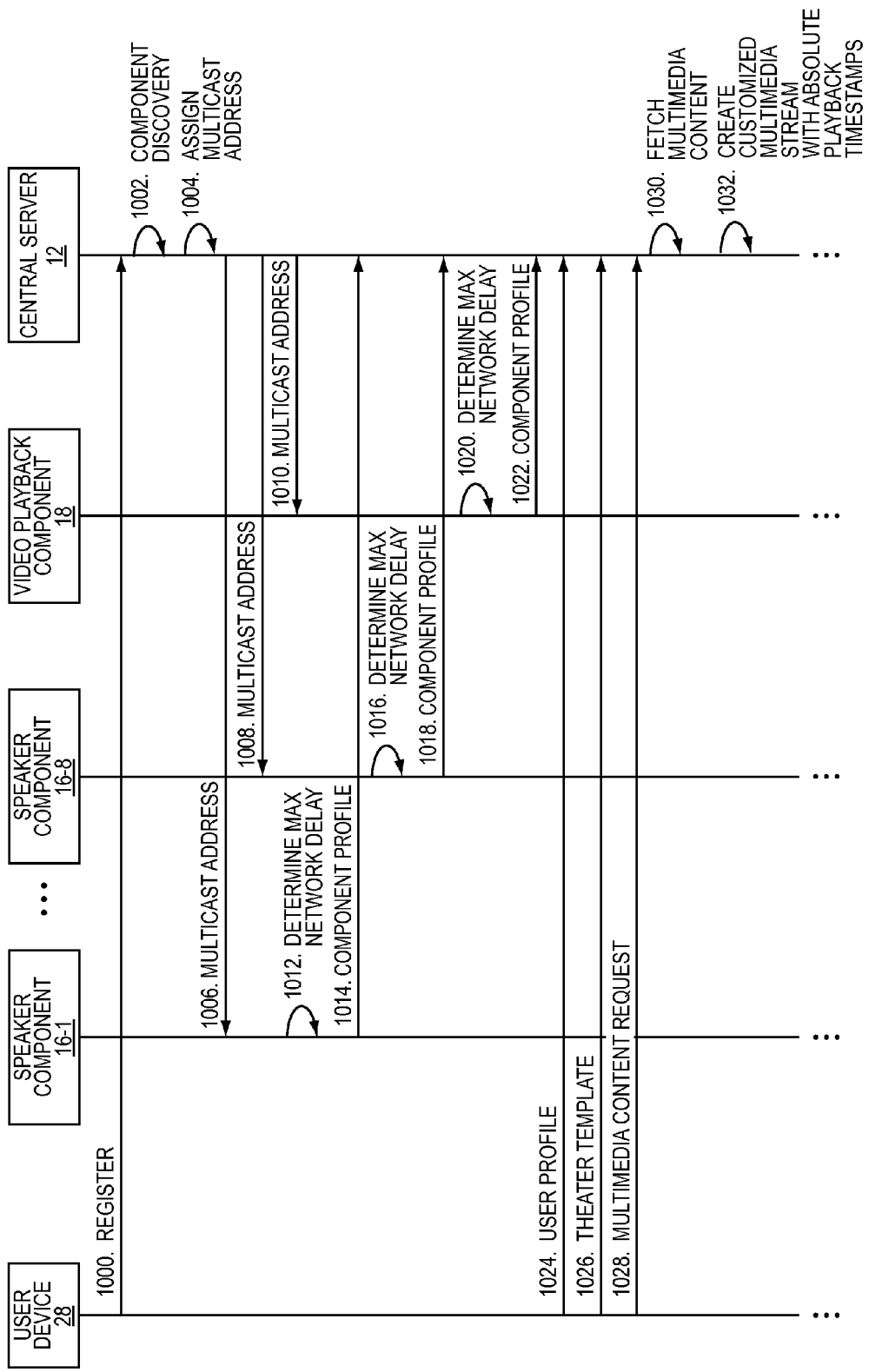
FIGS. 6A and 6B illustrate the operation of the virtualized home theater system of FIG. 1 according to one embodiment of the present disclosure.
Figure 6B:
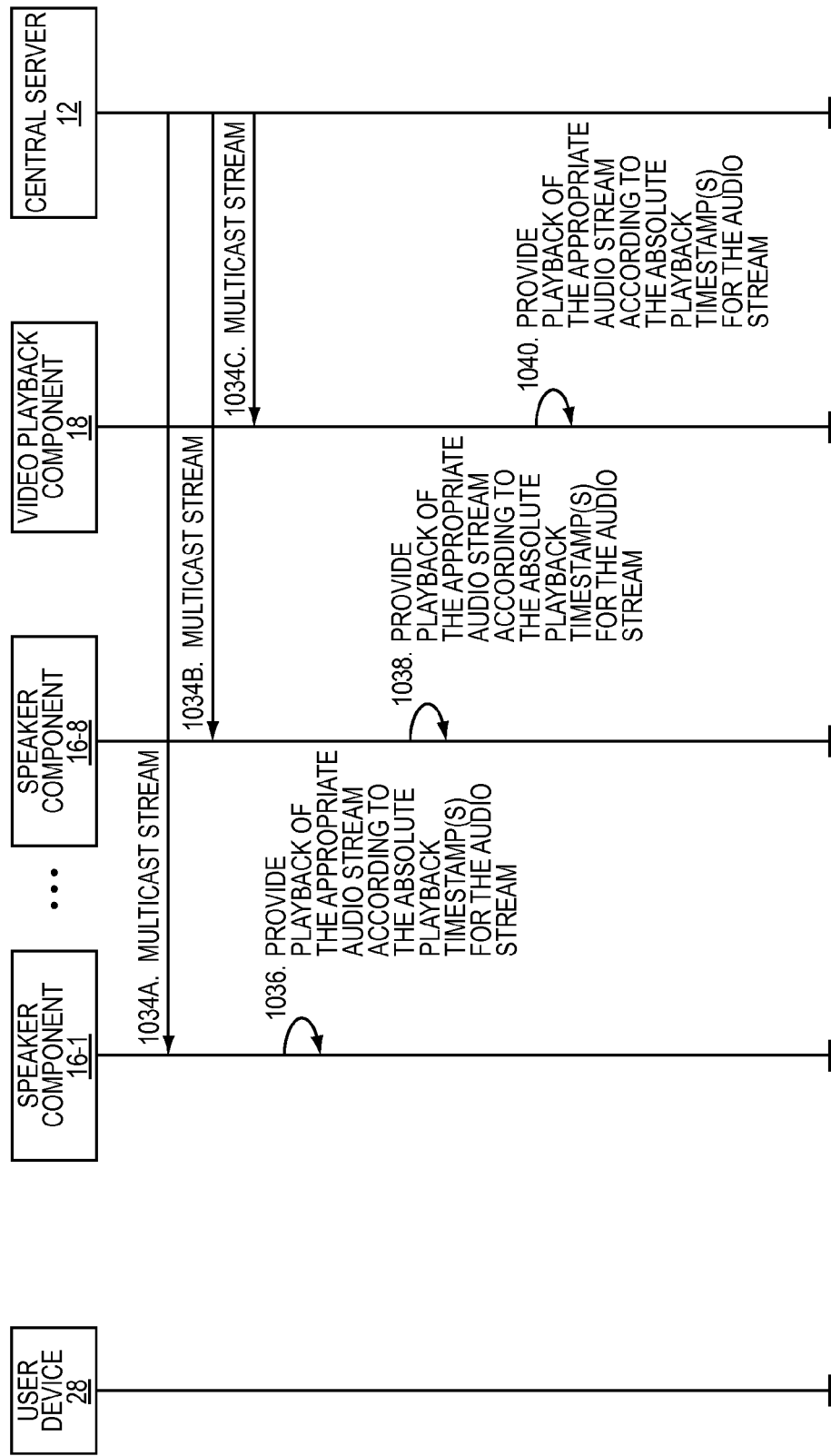

FIGS. 6A and 6B illustrate the operation of the system 10 of FIG. 1 according to one embodiment of the present disclosure. As illustrated, in this embodiment, a user of the user device 28 registers the home theater at the subscriber premises 20 with the virtualized home theater service 14 hosted by the central server 12 (step 1000). Next, the virtualized home theater service 14 performs a device discovery process in order to discover the speaker and video playback components 16 and 18 forming the home theater at the subscriber premises 20 (step 1002). More specifically, the virtualized home theater service 14 uses any suitable device discovery process to discover the speaker and video playback components 16 and 18 in a subnetwork provided by the modem 26 and/or the wireless router 24 at the subscriber premises 20. The virtualized home theater service 14 of the central server 12 also assigns a multicast address to the home theater (step 1004) and provides the multicast address to the speaker components 16-1 through 16-8 and the video playback component 18 forming the home theater (steps 1006-1010).

In this embodiment, the speaker component 16-1 next determines the maximum network delay observed by the speaker component 16-1 for data received from the virtualized home theater service 14 of the central server 12 in the manner described above (step 1012). At this point, since multicasting has not yet begun, the speaker component 16-1 may determine the maximum network delay based on other communications from the virtualized home theater service 14 such as, for example, transmission of the multicast address in step 1006. The speaker component 16-1 then sends the component profile of the speaker component 16-1 to the virtualized home theater service 14 of the central server 12 (step 1014). In a similar manner, the other speaker components, including the speaker component 16-8, determine their maximum network delays (step 1016) and send their component profiles to the virtualized home theater service 14 of the central server 12 (step 1018). Like the speaker components 16-1 through 16-8, the video playback component 18 also determines the maximum network delay of the video playback component 18 (step 1020) and sends the component profile of the video playback component 18 to the virtualized home theater service 14 of the central server 12 (step 1022). In addition, the user device 28 may provide user profiles of one or more users associated with the home theater and a theater template for the home theater to the virtualized home theater service 14 of the central server 12 (steps 1024 and 1026).

Some time thereafter, the user of the user device 28 makes a multimedia content request via the remote control function 30 of the user device 28. In response, the remote control function 30 of the user device 28 sends the multimedia content request to the virtualized home theater service 14 of the central server 12 (step 1028). Upon receiving the multimedia content request, the virtualized home theater service 14 of the central server 12 fetches the requested multimedia content and processes the multimedia content in the manner described above to provide a customized layered multicast stream including absolute playback timestamps (steps 1030 and 1032). As the layered multimedia stream is being created, the virtualized home theater service 14 of the central server 12 streams the layered multicast stream to the speaker components 16-1 through 16-8 and the video playback component 18 (steps 1034A-1034C). As the layered multicast stream is received, the speaker components 16-1 through 16-8 provide playback of corresponding audio streams from the layered multicast stream according to the absolute playback timestamps for the audio streams (steps 1036 and 1038). Likewise, the video playback component 18 provides playback of the video stream from the layered multicast stream according to the absolute playback timestamps for the video stream (step 1040).

Figure 7:
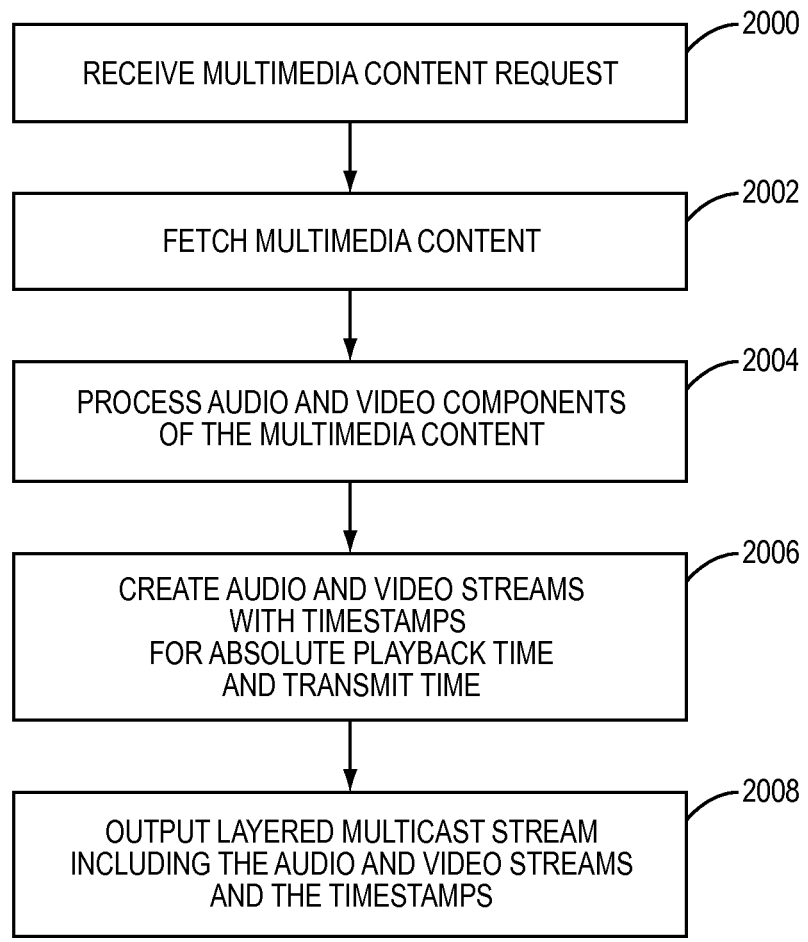
FIG. 7 is a flow chart illustrating the operation of the virtualized home theater service of FIG. 1 according to one embodiment of the present disclosure.

FIG. 7 is a flow chart illustrating the operation of the virtualized home theater service 14 according to one embodiment of the present disclosure. First, the virtualized home theater service 14 receives a multimedia content request for multimedia content to be provided to the home theater at the subscriber premises 20 (step 2000). In response to the multimedia content request, the multimedia content fetch function 38 (FIG. 3) of the virtualized home theater service 14 fetches the requested multimedia content (step 2002). As the requested multimedia content is being fetched and output by the multimedia content fetch function 38, audio and video components of the requested multimedia content are processed by the video transcoding function 40 and the audio processing function 42 to provide a video stream for the video playback component 18 and audio streams for the speaker components 16 (step 2004).

As the audio and video streams are provided, the timestamp determination and insertion function 44 inserts absolute playback timestamps and transmit timestamps for the audio and video streams (step 2006). More specifically, as the audio and video streams are provided, the timestamp determination and insertion function 44 utilizes the real-time clock to insert transmit timestamps defining the transmit times for corresponding points or segments in the audio and video streams. In addition, the timestamp determination and insertion function 44 inserts the absolute playback timestamps for corresponding points or segments in the audio and video streams. As discussed above, the absolute playback timestamps are delayed with respect to the time of transmission by at least the minimum insertion delay provided by the delay calculation function 46. Again, the delay calculation function 46 selects a largest total delay for any of the speaker and video playback components 16 and 18 in the home theater as the minimum insertion delay. The total delay for a home theater component is preferably the maximum network delay for that home theater component plus the worst-case internal delay of the home theater component and, optionally, any additional delay requests from the home theater component. Lastly, the output function 50 of the virtualized home theater service 14 outputs a layered multicast stream including the audio and video streams for the speaker and video playback components 16 and 18 as well as the absolute playback timestamps for the audio and video streams (step 2008).

Figure 8A:
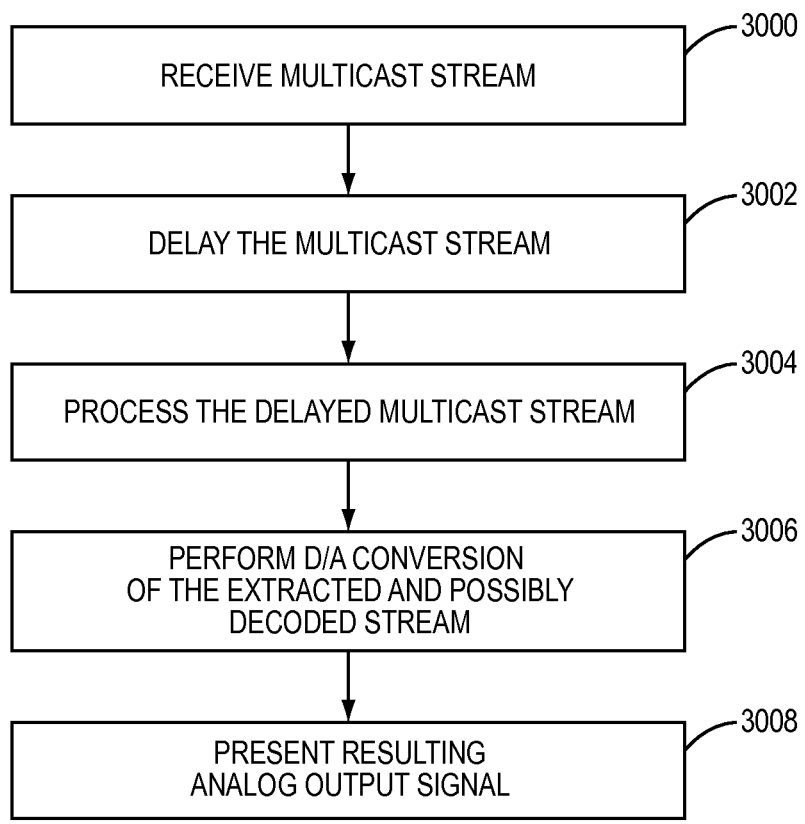
FIGS. 8A-8C are flow charts illustrating the operation of the home theater components of FIG. 1 according to one embodiment of the present disclosure.
Figure 8B:
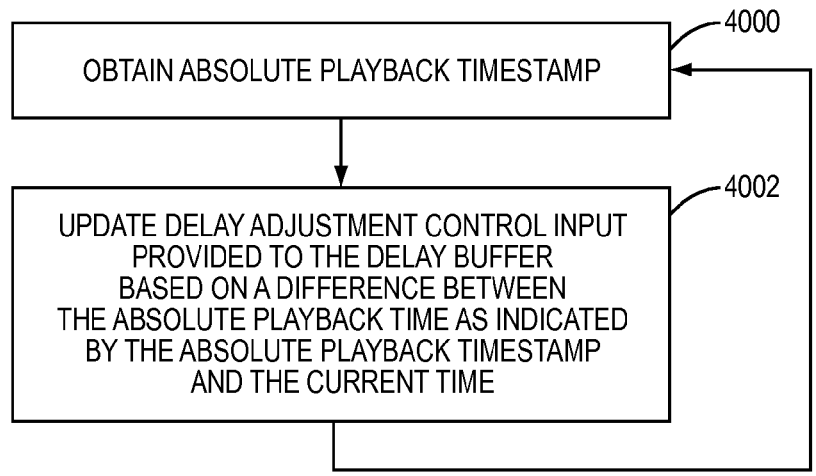
Figure 8C:
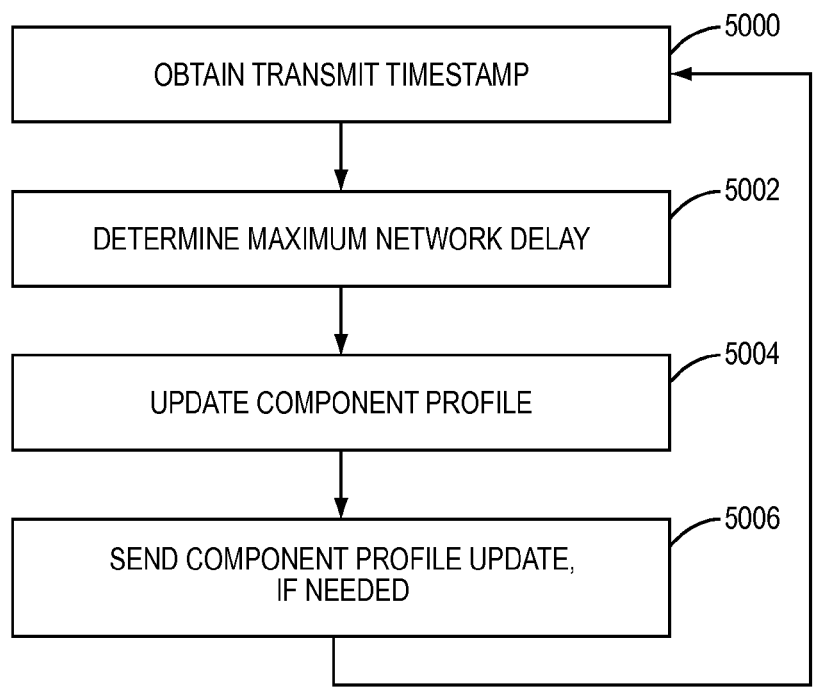

FIGS. 8A-8C are flow charts illustrating the operation of the speaker components 16 according to one embodiment of the present disclosure. First, the speaker component 16 receives a layered multicast stream (step 3000). As the layered multicast stream is received, the local wireless interface 74 of the speaker component 16 preferably extracts and outputs the audio stream destined for the speaker component 16. Preferably, the audio stream destined for the speaker component 16 is designated within the layered multicast stream by the IP address of the speaker component 16. Alternatively, some other identifier of the speaker component 16 may be used. As the audio stream for the speaker component 16 is output by the local wireless interface 74, the delay buffer 76 delays the audio stream by an amount of time corresponding to the delay adjustment control input from the delay adjustment calculation function 84 (step 3002). The amount of time by which the audio stream is delayed is controlled by the delay adjustment calculation function 84 such that playback of the audio stream by the amplified speaker 60 is synchronized, or at least substantially synchronized, with the absolute playback timestamps for the audio stream.

As the delayed audio stream is output by the delay buffer 54, the digital processor 56 processes the delayed audio stream to perform any desired specialized processing and to perform decoding, if needed (step 3004). As the processed and delayed audio stream is output by the digital processor 56, the processed and delayed audio stream is converted to an analog signal by the D/A converter 58 (step 3006) and the resulting analog signal is presented as sound via the amplified speaker 60 (step 3008).

FIG. 8B is a flow chart illustrating the operation of the delay adjustment calculation function 62 of the speaker component 16 according to one embodiment of the present disclosure. First, as the audio stream is being received, delayed, processed, and presented at the speaker component 16, the delay adjustment calculation function 62 obtains an absolute playback timestamp for the processed and delayed audio stream output by the digital processor 56 (step 4000). The delay adjustment calculation function 62 then updates the delay adjustment control input provided to the delay buffer 54 based on a difference between the absolute playback time as indicated by the absolute playback timestamp and the current time as indicated by the real-time clock (step 4002). More specifically, in the preferred embodiment, the delay adjustment calculation function 62 calculates a delta value for the delay adjustment control input based on the following equation:

$$\Delta DelayAdjustment = AbsolutePlaybackTime - CurrentTime + OutputDelay,$$

where $\Delta DelayAdjustment$ is the delta value for the delay adjustment control input, AbsolutePlaybackTime is the absolute playback time for the audio stream defined by the absolute playback timestamp, CurrentTime is the current time obtained from the accurate real-time clock, and OutputDelay is a delay resulting from the D/A converter 58 and the amplified speaker 60. Note that the consideration of the delay resulting from the D/A converter 58 and the amplified speaker 60 (i.e., the OutputDelay) is optional. The delay adjustment calculation function 62 then adjusts the delay adjustment control input provided to the delay buffer 54 according to the calculated delta value, $\Delta DelayAdjustment$. The delay adjustment calculation function 62 preferably repeats this process for each absolute playback timestamp or at least a subset of the absolute playback timestamps for the processed and delayed audio stream in order to update the delay adjustment control input over time as the audio stream is received.

FIG. 8C is a flow chart illustrating the operation of the maximum network delay calculation function 70 of the speaker component 16 according to one embodiment of the present disclosure. First, as the audio stream is being received, delayed, processed, and presented at the speaker component 16, the maximum network delay calculation function 70 obtains a transmit timestamp for the processed and delayed audio stream output by the digital processor 56 (step 5000). Next, the maximum network delay calculation function 70 determines a maximum network delay based on a difference between the transmit time indicated by the transmit timestamp and the current time as indicated by the real-time clock (step 5002). More specifically, in one embodiment, the difference between the transmit time and the current time is calculated. Optionally, the delay of the delay buffer 54 may be added back into the difference because the delay of the delay buffer 54 is not actually part of the network delay. Then, if the difference is greater than the previous maximum network delay for the speaker component 16, the maximum network delay of the speaker component 16 is set to the difference. Otherwise, the maximum network delay remains unchanged. In another embodiment, maximum network delay calculation function 70 stores the differences between transmit times and current times for a number of transmit timestamps over a predefined amount of time or for each of a predefined number of transmit timestamps. The largest difference value amount among those difference values may then be selected as the maximum network delay for the speaker component 16.

The maximum network delay calculation function 70 then updates the component profile for the speaker component 16 and sends an update for the component profile to the virtualized home theater service 14, if needed (steps 5004 and 5006). The maximum network delay calculation function 70 preferably repeats this process for future transmit timestamps in order to continue to update the maximum network delay for the speaker component 16 over time.

Before proceeding, it should be noted that the operation of the video playback component 18 is substantially the same as that of the speaker components 16 described above with respect to FIGS. 8A-8C. As such, the details are not repeated. However, also note that the video processing delay of the video playback component 18 may typically be much longer than that for the speaker components 16 due to the complexity of video compression/decompression.

Figure 9:
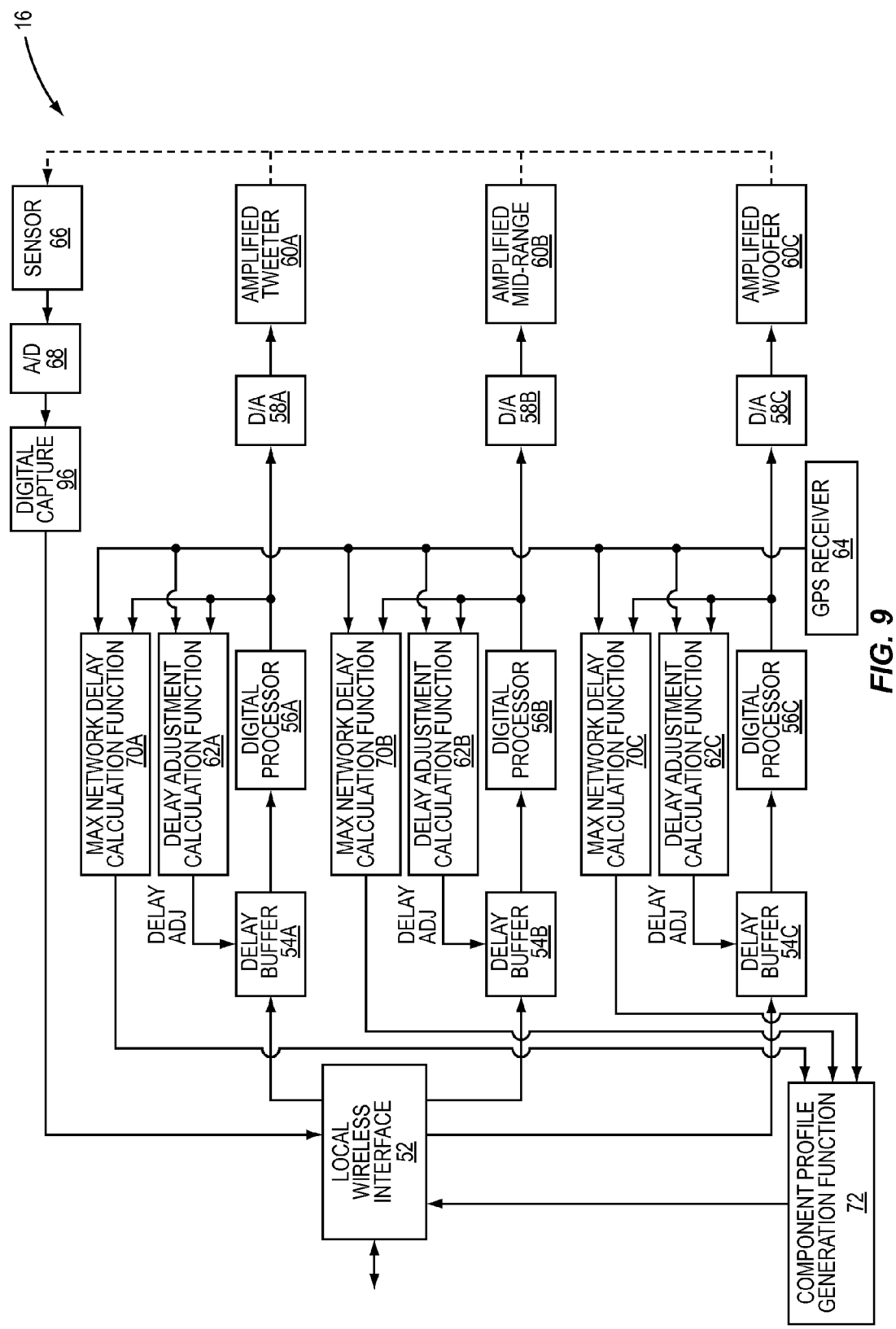
FIG. 9 is a block diagram of one of the speaker components of FIG. 1 wherein the speaker component includes multiple speakers for different frequency bands according to another embodiment of the present disclosure.

FIG. 9 illustrates the speaker component 16 according to another embodiment of the present disclosure. In this embodiment, rather than having a single amplified speaker 60 (see FIG. 4), the speaker component 16 includes multiple amplified speakers, which in this embodiment are an amplified tweeter 60A, an amplified mid-range 60B, and an amplified woofer 60C. In other words, in this embodiment, the speaker component 16 includes three amplified speakers, namely the amplified tweeter 60A, the amplified mid-range 60B, and the amplified woofer 60C, within a single enclosure.

As will be discussed below in more detail with respect to FIG. 10, in this embodiment, the virtualized home theater service 14 performs a cross-over function to create three separate audio streams for the amplified tweeter 60A, the amplified mid-range 60B, and the amplified woofer 60C. As such, in operation, the local wireless interface 52 receives a layered multicast stream from the virtualized home theater service 14 via the wireless router 24 and extracts the audio streams destined for the speaker component 16. Specifically, in this embodiment, since there are three separate audio streams destined for the speaker component 16, the local wireless interface 52 extracts the audio stream destined for the amplified tweeter 60A and outputs that audio stream to delay buffer 54A, extracts the audio stream destined for the amplified mid-range 60B and outputs that audio stream to delay buffer 54B, and extracts the audio stream destined for the amplified woofer 60C and outputs that audio stream to delay buffer 54C.

As the local wireless interface 52 outputs the audio stream for the amplified tweeter 60A, the delay buffer 54A buffers the audio stream under the control of a delay adjustment control input in order to output a delayed audio stream. The delayed audio stream is delayed with respect to the audio stream input to the delay buffer 54A by an amount of time defined by the delay adjustment control input. The delay adjustment control input is provided such that playback of the audio stream at the amplified tweeter 60A is synchronized, or at least substantially synchronized, with the absolute playback timestamps for the audio stream.

As the delayed audio stream is output by the delay buffer 54A, in this embodiment, a digital processor 56A processes the delayed audio stream to perform any desired specialized processing and, if needed, decoding of the audio stream. As the processed and delayed audio stream is output by the digital processor 56A, in this embodiment, a D/A converter 58A converts the processed and delayed audio stream to an analog signal that is used to drive the amplified tweeter 60A.

A delay adjustment calculation function 62A operates to provide the delay adjustment control input to the delay buffer 54A. More specifically, in this embodiment, the delay adjustment calculation function 62A obtains an absolute playback timestamp for the processed and delayed audio stream from the digital processor 56A. The delay adjustment calculation function 62A then calculates a delta value for the delay adjustment control input based on a difference between the absolute playback time defined by the absolute playback timestamp and a current time provided by an accurate real-time clock. In this embodiment, the delay adjustment calculation function 62A calculates the delta value for the delay adjustment control input based on the following equation:

$$\Delta DelayAdjustment = AbsolutePlaybackTime - CurrentTime,$$

where ΔDelayAdjustment is the delta value for the delay adjustment control input, AbsolutePlaybackTime is the absolute playback time for the audio stream defined by the absolute playback timestamp, and CurrentTime is the current time obtained from the accurate real-time clock. Note that while not illustrated, the delay adjustment calculation function 62A may also consider a delay resulting from the D/A converter 58A and the amplified tweeter 60A. The delay adjustment calculation function 62A then adjusts the delay adjustment control input provided to the delay buffer 54A according to the calculated delta value, ΔDelayAdjustment. The delay adjustment calculation function 62A preferably repeats this process for each absolute playback timestamp or at least a subset of the absolute playback timestamps in order to update the delay adjustment control input to the delay buffer 54A over time as the audio stream for the amplified tweeter 60A is received.

In this embodiment, the accurate real-time clock is provided by the GPS receiver 64. However, the present disclosure is not limited thereto. Again, the purpose of the accurate real-time clock is to provide a real-time clock that is substantially synchronized with real-time clocks of the virtualized home theater service 14, the other speaker components 16, and the video playback component 18. However, while GPS receivers, such as the GPS receiver 64, are used in the preferred embodiment, any technique for providing synchronized real-time clocks at the virtualized home theater service 14 and the speaker and video playback components 16 and 18 may alternatively be used.

A maximum network delay calculation function 70A operates to calculate the maximum network delay observed by the speaker component 16 for data received for the amplified tweeter 60A from the virtualized home theater service 14. In operation, as the processed and delayed audio stream is output by the digital processor 56A, the maximum network delay calculation function 70A obtains a transmit timestamp for the processed and delayed audio stream. The maximum network delay calculation function 70A then determines the maximum network delay for the amplified tweeter 60A by comparing the transmit time defined by the transmit timestamp to the current time provided by the real-time clock of the speaker component 16. Again, in this embodiment, the real-time clock is provided by the GPS receiver 64. More specifically, the maximum network delay calculation function 70A determines a difference between the current time and the transmit time. Optionally, the delay of the delay buffer 54A may be added back into the difference because the delay of the delay buffer 54A is not actually part of the network delay. The difference is then compared to the previous maximum network delay for the amplified tweeter 60A, if any. If the difference is greater than the previous maximum network delay, then the difference is stored as the new maximum network delay. This process is preferably repeated over time for each transmit timestamp for the audio stream for the amplified tweeter 60A or for a subset of the transmit timestamps for the audio stream for the amplified tweeter 60A.

Note that the maximum network delay may timeout after a predefined amount of time. For instance, in one embodiment, the maximum network delay calculation function 70A may store the difference between transmit time and the current time for each of a number of timestamps for the audio stream for the amplified tweeter 60A. The number of timestamps may be a number of timestamps for data received from the virtualized home theater service 14 over a defined amount of time or the last N timestamps, where N is a defined integer greater than 1. The largest stored difference value may then be selected as the maximum network delay for the amplified tweeter 60A. The maximum network delay for the amplified tweeter 60A is provided to the component profile generation function 72.

In a similar manner, the audio stream for the amplified mid-range 60B and corresponding timestamps are processed by the delay buffer 54B, a digital processor 56B, a D/A converter 58B, the amplified mid-range 60B, a delay adjustment calculation function 62B, and a maximum network delay calculation function 70B. Likewise, the audio stream for the amplified woofer 60C and corresponding timestamps are processed by the delay buffer 54C, a digital processor 56C, a D/A converter 58C, the amplified woofer 60C, a delay adjustment calculation function 62C, and a maximum network delay calculation function 70C.

The speaker component 16 also includes the component profile generation function 72. The component profile generation function 72 operates to generate the component profile for the speaker component 16 and to provide the component profile for the speaker component 16 to the virtualized home theater service 14. In this embodiment, the component profile generation function 72 receives the maximum network delays of the amplified tweeter 60A, the amplified mid-range 60B, and the amplified woofer 60C from the maximum network delay calculation functions 70A, 70B, and 70C, respectively. The component profile generation function 72 then selects the largest of these maximum network delays as the maximum network delay of the speaker component 16. The maximum network delay of the speaker component 16 is included in the component profile for the speaker component 16. In addition, the component profile may include a worst-case internal delay of the speaker component 16, which is preferably a predefined value programmed into the speaker component 16. Still further, the component profile may include data regarding capabilities of the speaker component 16. In the preferred embodiment, the component profile generation function 72 provides the component profile to the virtualized home theater service 14 and thereafter provides updates for the component profile to the virtualized home theater service 14 as needed.

Lastly, in this embodiment, the speaker component 16 includes the sensor 66, the ND converter 68, and a digital capture function 96. Again, the sensor 66 is an audio capture device such as a microphone that operates to sense the audio output by the speaker component 16 (i.e., the sound output by the amplified tweeter 60A, the amplified mid-range 60B, and the amplified woofer 60C). The output of the sensor 66 is digitized by the ND converter 68 and captured and timestamped by the digital capture function 96. The captured digital data and timestamps may be provided to the virtualized home theater service 14 and utilized for various enhanced applications such as optimizing the cross-over function used to create the audio streams for the amplified tweeter 60A, the amplified mid-range 60B, and the amplified woofer 60C.

Figure 10:
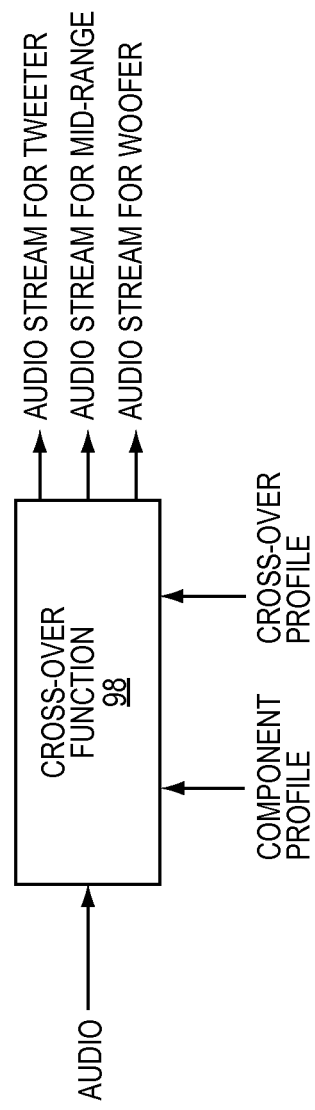
FIG. 10 illustrates a cross-over function of the virtualized home theater component used to provide separate audio streams for multiple speakers of the speaker component of FIG. 9 according to one embodiment of the present disclosure.

FIG. 10 illustrates a cross-over function 98 that may be provided by the virtualized home theater service 14 to provide separate audio streams for the amplified tweeter 60A, the amplified mid-range 60B, and the amplified woofer 60C of the speaker component 16 of FIG. 9 according to one embodiment of the present disclosure. The cross-over function 98 is implemented within the audio processing function 42 (FIG. 3) of the virtualized home theater service 14. In general, as will be appreciated by one of ordinary skill in the art, the amplified tweeter 60A, the amplified mid-range 60B, and the amplified woofer 60C handle different frequency bands. As such, the cross-over function 98 receives the audio stream for the speaker component 16, or the audio content for an audio channel for the speaker component 16, and creates three separate audio streams for the amplified tweeter 60A, the amplified mid-range 60B, and the amplified woofer 60C. The three separate audio streams generally include a high frequency band audio stream for the amplified tweeter 60A, a medium frequency band audio stream for the amplified mid-range 60B, and a low frequency band audio stream for the amplified woofer 60C.

More specifically, the cross-over function 98 creates the three separate audio streams for the amplified tweeter 60A, the amplified mid-range 60B, and the amplified woofer 60C based on data from the component profile of the speaker component 16 and a cross-over profile. The data from the component profile of the speaker component 16 may include, for example, a frequency response and amplifier-to-sound efficiency for each of the amplified tweeter 60A, the amplified mid-range 60B, and the amplified woofer 60C. The cross-over profile identifies separation frequencies for splitting the audio stream into the three separate audio streams for the amplified tweeter 60A, the amplified mid-range 60B, and the amplified woofer 60C. Note that there may be overlap between the frequency bands covered by the amplified tweeter 60A, the amplified mid-range 60B, and the amplified woofer 60C. The cross-over profile is preferably configurable by the user of the user device 28 via the remote control function 30.

As an example, the component profile for the speaker component 16 may define frequency bands that the amplified tweeter 60A, the amplified mid-range 60B, and the amplified woofer 60C are capable of handling as:

Woofer: 10 Hz-600 Hz
Midrange: 300 Hz-13 KHz
Tweeter: 9 KHz-22 KHz

In addition, the cross-over profile may define frequency bands for the separate audio streams for the amplified tweeter 60A, the amplified mid-range 60B, and the amplified woofer 60C as:

Woofer: 20 Hz-400 Hz
Midrange: 390 Hz-11 KHz
Tweeter: 10 KHz-20 KHz

The cross-over function 98 then creates the three separate audio streams for the amplified tweeter 60A, the amplified mid-range 60B, and the amplified woofer 60C based on the component profile of the speaker component 16 and the cross-over profile. Note that by having tighter frequency bands in the cross-over profile than in the component profile, a flatter overall frequency response for the speaker component 16 is possible. Additionally, the cross-over function 98 of the virtualized home theater service 14 may be more accurate than that which could be achieved using traditional analog filters at the speaker component 16. Also, the cross-over function 98 enables a user to quickly and easily re-configure the cross-over profile.

Figure 11:
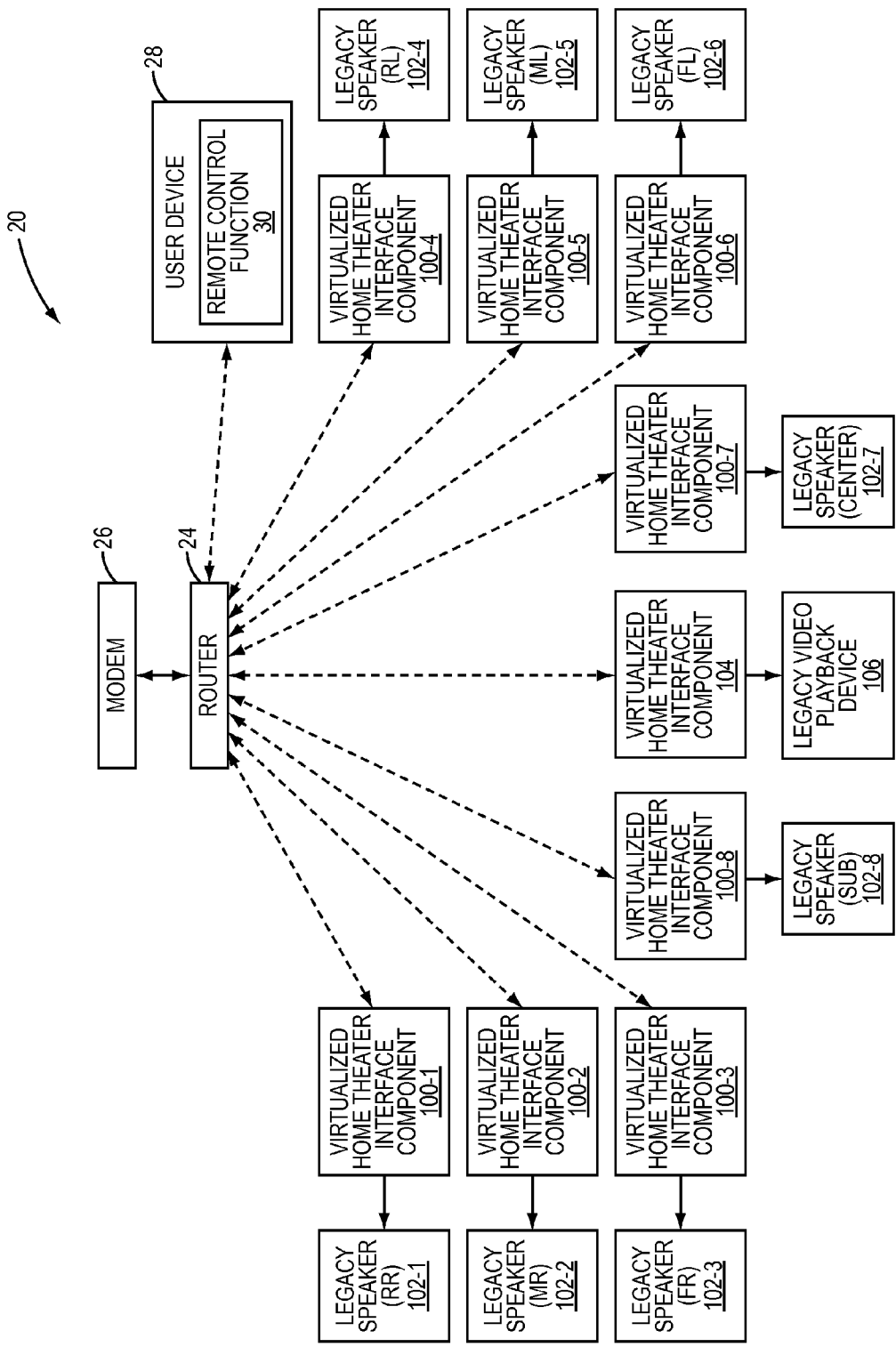
FIG. 11 illustrates a virtualized home theater system for legacy speaker and video playback devices according to another embodiment of the present disclosure.

FIG. 11 illustrates the home theater at the subscriber premises 20 wherein legacy speakers and legacy video playback devices are supported according to another embodiment of the present disclosure. This embodiment is substantially the same as that in FIG. 1. However, in this embodiment, the amplified speakers are separate from the remaining circuitry needed to receive and process audio streams from the virtualized home theater service 14, and the video presentation device (e.g., display or television) is separate from the remaining circuit needed to receive and process the video stream from the virtualized home theater service 14.

More specifically, as illustrated, the home theater includes a number of virtualized home theater interface components 100-1 through 100-8 (hereinafter "interface components") for a number of legacy speakers 102-1 through 102-8. The interface components 100-1 through 100-8 are generally referred to herein as interface components 100, and the legacy speakers 102-1 through 102-8 are generally referred to herein as legacy speakers 102. In addition, the home theater includes a virtualized home theater interface component 104 (hereinafter "interface component") for a legacy video playback device 106. Note that the interface components 100 and 104 are also referred to herein as home theater components.

The interface components 100 are connected to the wireless router 24 via local wireless interfaces such as, but not limited to, IEEE 802.11n interfaces and are further connected to the legacy speakers 102 via wired connections. For the legacy speakers 102, the wired connections are preferably, but not necessarily, wired analog connections. Similarly, the interface component 104 is connected to the wireless router 24 via a local wireless interface such as, but not limited to, an IEEE 802.11n interface and is further connected to the legacy video playback device 106 via a wired connection. For the legacy video playback device 106, the wired connection may be an analog connection (e.g., High Definition Multimedia Interface (HDMI) or Digital Video Interface (DVI) connection).

In operation, the virtualized home theater service 14 sends audio streams for the legacy speakers 102 and a video stream for the legacy video playback device 106 preferably via a layered multicast stream. The interface components 100 receive the audio streams for the legacy speakers 102 and provide playback of the audio streams via the legacy speakers 102 according to the absolute playback timestamps for the audio streams. Similarly, the interface component 104 receives the video stream for the legacy video playback device 106 and provides playback of the video stream via the legacy video playback device 106 according to the absolute playback timestamps for the video stream.

Figure 12:
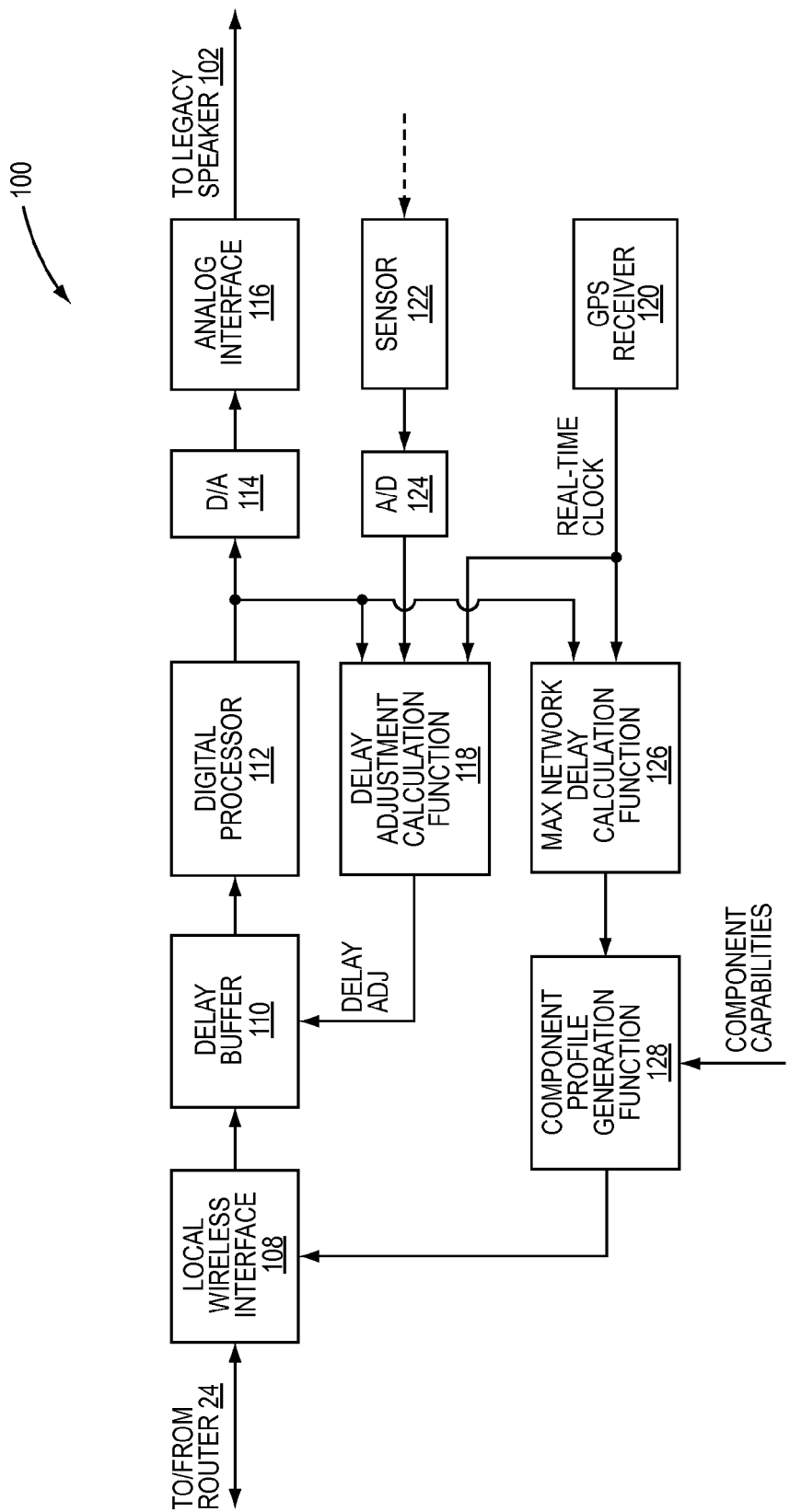
FIG. 12 is a block diagram of one of the interface components for one of the legacy speaker components of the virtualized home theater system of FIG. 11 according to one embodiment of the present disclosure.

FIG. 12 is a block diagram of the interface component 100 according to one embodiment of the present disclosure. Note that the interface component 100 is substantially the same as the speaker component 16 of FIG. 4. However, the external legacy speaker 102 replaces the internal amplified speaker 60. As illustrated, the interface component 100 includes a local wireless interface 108, a delay buffer 110, a digital processor 112, a D/A converter 114, and an analog interface 116 connected to the legacy speaker 102. The local wireless interface 108 is a physical component that is implemented in hardware. Note, however, that software may reside within and be executed by a processor within the local wireless interface 108. The local wireless interface 108 preferably operates according to the IEEE 802.11n standard. However, the local wireless interface 108 may alternatively operate according to any local wireless communication standard having bandwidth suitable for transferring the required audio stream.

In operation, the local wireless interface 108 receives a layered multicast stream from the virtualized home theater service 14 for multimedia content desired to be presented by the home theater in the subscriber premises 20. As the layered multicast stream is received, the local wireless interface 108 extracts an audio stream destined for the interface component 100 (and eventually the legacy speaker 102) from the layered multicast stream and outputs the audio stream to the delay buffer 110. Note that, as discussed above, the layered multicast stream is the preferred manner in which to deliver the audio and video streams for the desired multimedia content. However, the present disclosure is not limited thereto. For example, separate unicast streams may be used to deliver the audio and video streams to the interface components 100 and 104. Further, the audio stream is preferably, but not necessarily, received in a RAW, or lossless/uncompressed, format to avoid any re-compression quality degradation.

The delay buffer 110 is, or at least includes, physical memory such as, but not limited to, RAM, Flash memory, or the like. As the local wireless interface 108 outputs the audio stream, the delay buffer 110 buffers the audio stream under the control of a delay adjustment control input in order to output a delayed audio stream. The delayed audio stream is delayed with respect to the audio stream input to the delay buffer 110 by an amount of time defined by the delay adjustment control input. The delay adjustment control input is provided such that playback of the audio stream at the legacy speaker 102 is synchronized, or at least substantially synchronized, with the absolute playback timestamps for the audio stream.

As the delayed audio stream is output by the delay buffer 110, the digital processor 112 processes the delayed audio stream to perform any desired specialized processing and, if needed, decoding of the audio stream. Note that the digital processor 112 may not be needed if the audio stream is in a RAW format and no specialized audio processing is desired. With regards to specialized processing, if, for example, the legacy speaker 102 were to have multiple amplified speakers (e.g., a tweeter, a mid-range, and a woofer), the digital processor 112 may perform a cross-over function in order to provide separate audio streams for the multiple amplified speakers. As the processed and delayed audio stream is output by the digital processor 112, in this embodiment, the D/A converter 114 converts the processed and delayed audio stream to an analog signal that is output by the analog interface 116 in order to drive the legacy speaker 102.

The interface component 100 also includes a delay adjustment calculation function 118 that operates to provide the delay adjustment control input to the delay buffer 110. More specifically, in this embodiment, the delay adjustment calculation function 118 obtains an absolute playback timestamp for the processed and delayed audio stream from the digital processor 112. The delay adjustment calculation function 118 then calculates a delta value for the delay adjustment control input based on a difference between the absolute playback time defined by the absolute playback timestamp and a current time provided by an accurate real-time clock. In addition, the delay adjustment calculation function 118 may consider an output delay resulting from the D/A converter 114, the analog interface 116, and the legacy speaker 102. Thus, in this embodiment, the delay adjustment calculation function 118 calculates the delta value for the delay adjustment control input based on the following equation:

$$\Delta DelayAdjustment = AbsolutePlaybackTime - CurrentTime + OutputDelay,$$

where $\Delta DelayAdjustment$ is the delta value for the delay adjustment control input, AbsolutePlaybackTime is the absolute playback time for the audio stream defined by the absolute playback timestamp, CurrentTime is the current time obtained from the accurate real-time clock, and OutputDelay is a delay resulting from the D/A converter 114, the analog interface 116, and the legacy speaker 102. The delay adjustment calculation function 118 then adjusts the delay adjustment control input according to the calculated delta value, $\Delta DelayAdjustment$. The delay adjustment calculation function 118 preferably repeats this process for each absolute playback timestamp or at least a subset of the absolute playback timestamps in order to update the delay adjustment control input over time as the audio stream is received.

In this embodiment, the accurate real-time clock is provided by a GPS receiver 120. However, the present disclosure is not limited thereto. The purpose of the accurate real-time clock is to provide a real-time clock that is substantially synchronized with real-time clocks of the virtualized home theater service 14 and the other interface components 100 and 104. However, while GPS receivers, such as the GPS receiver 120, are used in the preferred embodiment, any technique for providing synchronized real-time clocks at the virtualized home theater service 14 and the interface components 100 and 104 may alternatively be used.

Further, in this embodiment, the output delay, OutputDelay, is determined by the delay adjustment calculation function 118 by comparing the processed and delayed audio stream to a feedback signal provided by a sensor 122 and an A/D converter 124. In this embodiment, the sensor 122 is a microphone that captures sound output by the legacy speaker 102. The output of the sensor 122 is digitized by the N/D converter 124 and then compared to a buffered version of the processed and delayed audio stream in order to determine the delay between the output of the digital processor 112 and the output of the legacy speaker 102, which is the output delay.

The interface component 100 also includes a maximum network delay calculation function 126 that operates to calculate the maximum network delay observed by the interface component 100 for data received from the virtualized home theater service 14. In operation, as the processed and delayed audio stream is output by the digital processor 112, the maximum network delay calculation function 126 obtains a transmit timestamp for the processed and delayed audio stream. The maximum network delay calculation function 126 then determines the maximum network delay for the interface component 100 by comparing the transmit time defined by the transmit timestamp to the current time provided by the real-time clock of the interface component 100. Again, in this embodiment, the real-time clock is provided by the GPS receiver 120. More specifically, the maximum network delay calculation function 126 determines a difference between the current time and the transmit time. Optionally, the delay of the delay buffer 110 may be added back into the difference because the delay of the delay buffer 110 is not actually part of the network delay. The difference is then compared to the previous maximum network delay for the interface component 100, if any. If the difference is greater than the previous maximum network delay, then the difference is stored as the new maximum network delay. This process is preferably repeated over time for each transmit timestamp for the audio stream or for a subset of the transmit timestamps for the audio stream.

Note that the maximum network delay may timeout after a predefined amount of time. For instance, in one embodiment, the maximum network delay calculation function 126 may store the difference between the transmit time and the current time for each of a number of timestamps. The number of timestamps may be a number of timestamps for data received from the virtualized home theater service 14 over a defined amount of time or the last N timestamps, where N is a defined integer greater than 1. The largest stored difference value may then be selected as the maximum network delay for the interface component 100.

Lastly, the interface component 100 includes a component profile generation function 128 that operates to generate the component profile for the interface component 100 and to provide the component profile for the interface component 100 to the virtualized home theater service 14. The component profile includes the maximum network delay of the interface component 100 as calculated by the maximum network delay calculation function 126. In addition, the component profile may include a worst-case internal delay of the interface component 100 and/or the legacy speaker 102, which are preferably predefined values programmed into or otherwise obtained by the interface component 100. Still further, the component profile may include data regarding capabilities of the legacy speaker 102. In the preferred embodiment, the component profile generation function 128 provides the component profile to the virtualized home theater service 14 and thereafter provides updates for the component profile to the virtualized home theater service 14 as needed.

Figure 13:
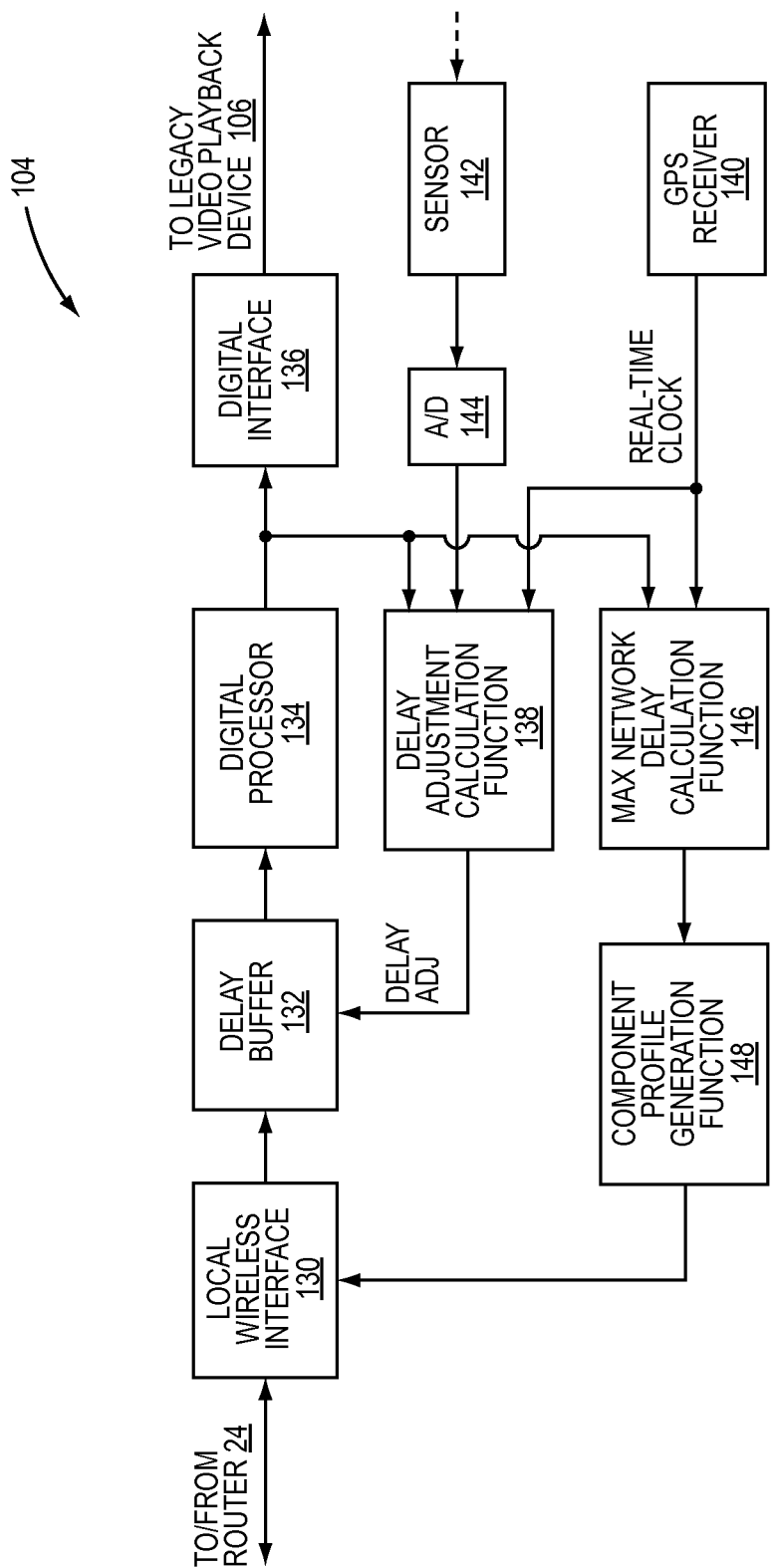
FIG. 13 is a block diagram of the interface component for the legacy video playback device of the virtualized home theater system of FIG. 11 according to one embodiment of the present disclosure.

FIG. 13 is a block diagram of the interface component 104 of the legacy video playback device 106 of FIG. 11 according to one embodiment of the present disclosure. As illustrated, the interface component 104 includes a local wireless interface 130, a delay buffer 132, a digital processor 134, and a digital interface 136 connected to the legacy video playback device 106. The local wireless interface 130 is a physical component that is implemented in hardware. Note, however, that software may reside within and be executed by a processor within the local wireless interface 130. The local wireless interface 130 preferably operates according to the IEEE 802.11n standard. However, the local wireless interface 130 may alternatively operate according to any local wireless communication standard having bandwidth suitable to transferring the required audio stream.

In operation, the local wireless interface 130 receives a layered multicast stream from the virtualized home theater service 14 for multimedia content desired to be presented by the home theater in the subscriber premises 20. As the layered multicast stream is received, the local wireless interface 130 extracts the video stream destined for the interface component 104 of the legacy video playback device 106 from the layered multicast stream and outputs the video stream to the delay buffer 132. Note that, as discussed above, the layered multicast stream is the preferred manner in which to deliver the audio and video streams for the desired multimedia content to the interface components 100 and 104. However, the present disclosure is not limited thereto. For example, separate unicast streams may alternatively be used to deliver the audio and video streams to the interface components 100 and 104. Further, the video stream is preferably, but not necessarily, received in a compressed format.

The delay buffer 132 is, or at least includes, physical memory such as, but not limited to, RAM, Flash memory, or the like. As the local wireless interface 130 outputs the video stream, the delay buffer 132 buffers the video stream under the control of a delay adjustment control input in order to output a delayed video stream. The delayed video stream is delayed with respect to the video stream input to the delay buffer 132 by an amount of time defined by the delay adjustment control input. The delay adjustment control input is provided such that playback of the video stream at the legacy video playback device 106 is synchronized, or at least substantially synchronized, with the absolute playback timestamps for the video stream.

As the delayed video stream is output by the delay buffer 132, the digital processor 134 processes the delayed video stream to decode the video stream as well as perform any desired specialized processing. As the processed and delayed video stream is output by the digital processor 134, in this embodiment, the digital interface 136 outputs the processed and delayed video stream to the legacy video playback device 106 in a desired digital format such as, for example, HDMI or DVI format.

The interface component 104 also includes a delay adjustment calculation function 138 that operates to provide the delay adjustment control input to the delay buffer 132. More specifically, in this embodiment, the delay adjustment calculation function 138 obtains an absolute playback timestamp for the processed and delayed video stream from the digital processor 134. The delay adjustment calculation function 138 then calculates a delta value for the delay adjustment control input based on a difference between the absolute playback time defined by the absolute playback timestamp and a current time provided by an accurate real-time clock. In addition, the delay adjustment calculation function 138 may consider an output delay resulting from the digital interface 136 and the legacy video playback device 106. Thus, in this embodiment, the delay adjustment calculation function 138 calculates the delta value for the delay adjustment control input based on the following equation:

$$\Delta\text{DelayAdjustment}=\text{AbsolutePlaybackTime}-\text{CurrentTime}+\text{OutputDelay},$$

where $\Delta$DelayAdjustment is the delta value for the delay adjustment control input, AbsolutePlaybackTime is the absolute playback time for the video stream defined by the absolute playback timestamp, CurrentTime is the current time obtained from the accurate real-time clock, and OutputDelay is a delay resulting from the digital interface 136 and the legacy video playback device 106. The delay adjustment calculation function 138 then adjusts the delay adjustment control input according to the calculated delta value, $\Delta$DelayAdjustment. The delay adjustment calculation function 138 preferably repeats this process for each absolute playback timestamp or at least a subset of the absolute playback timestamps in order to update the delay adjustment control input over time as the video stream is received.

In this embodiment, the accurate real-time clock is provided by a GPS receiver 140. However, the present disclosure is not limited thereto. The purpose of the accurate real-time clock is to provide a real-time clock that is substantially synchronized with real-time clocks of the virtualized home theater service 14 and the other interface components 100 and 104. However, while GPS receivers, such as the GPS receiver 140, are used in the preferred embodiment, any technique for providing synchronized real-time clocks at the virtualized home theater service 14 and the interface components 100 and 104 may alternatively be used.

Further, in this embodiment, the output delay, OutputDelay, is determined by the delay adjustment calculation function 138 by comparing the processed and delayed video stream to a feedback signal provided by a sensor 142 and an A/D converter 144. In this embodiment, the sensor 142 is a video capture device, such as a camera, that captures the video output by the legacy video playback device 106. The output of the sensor 142 is digitized by the ND converter 144 and then compared to a buffered version of the processed and delayed video stream in order to determine the delay between the output of the digital processor 134 and the output of the legacy video playback device 106.

The interface component 104 also includes a maximum network delay calculation function 146 that operates to calculate the maximum network delay observed by the interface component 104 for data received from the virtualized home theater service 14. In operation, as the processed and delayed video stream is output by the digital processor 134, the maximum network delay calculation function 146 obtains a transmit timestamp for the processed and delayed video stream. The maximum network delay calculation function 146 then determines the maximum network delay for the interface component 104 by comparing the transmit time defined by the transmit timestamp to the current time provided by the real-time clock of the interface component 104. Again, in this embodiment, the real-time clock is provided by the GPS receiver 140. More specifically, the maximum network delay calculation function 146 determines a difference between the current time and the transmit time. Optionally, the delay of the delay buffer 132 may be added back into the difference because the delay of the delay buffer 132 is not actually part of the network delay. The difference is then compared to the previous maximum network delay for the interface component 104, if any. If the difference is greater than the previous maximum network delay, then the difference is stored as the new maximum network delay. This process is preferably repeated over time for each transmit timestamp for the video stream or for a subset of the transmit timestamps for the video stream.

Note that the maximum network delay may timeout after a predefined amount of time. For instance, in one embodiment, the maximum network delay calculation function 146 may store the difference between transmit time and the current time for each of a number of timestamps. The number of timestamps may be a number of timestamps for data received from the virtualized home theater service 14 over a defined amount of time or the last N timestamps, where N is a defined integer greater than 1. The largest stored difference value may then be selected as the maximum network delay for the interface component 104.

Lastly, the interface component 104 includes a component profile generation function 148 that operates to generate and provide the component profile for the interface component 104 to the virtualized home theater service 14. The component profile includes the maximum network delay of the interface component 104 as calculated by the maximum network delay calculation function 146. In addition, the component profile may include a worst-case internal delay of the interface component 104 and/or the legacy video playback device 106, which are preferably predefined values programmed into or otherwise obtained by the interface component 104. Still further, the component profile may include data regarding capabilities of the legacy video playback device 106. In the preferred embodiment, the component profile generation function 148 provides the component profile to the virtualized home theater service 14 and thereafter provides updates for the component profile to the virtualized home theater service 14 as needed.

Synchronization of the real-time clocks of the virtualized home theater service 14 and the interface components 100 and 104 is required for synchronous playback of the audio and video streams by the legacy speakers 102 and the legacy video playback device 106 according to the absolute playback timestamps. In the preferred embodiment, an audio to video offset between playback of the audio streams and playback of the video stream is less than 10 ms such that lip synchronization issues are avoided. In addition, an inter-channel phase delay, which can be defined as the difference in group delay between the audio streams played by the legacy speakers 102, is preferably under one percent. This requires increased real-time clock accuracy as audio frequency increases. For instance, a one percent inter-channel phase delay requires 0.5 microsecond accuracy at 20 kHz, 0.6 microsecond accuracy at 15 kHz, and 1 microsecond accuracy at 10 kHz. The GPS receivers 48, 120, and 140 of the virtualized home theater service 14 and the interface components 100 and 104, respectively, can provide synchronous real-time clocks having 0.3 microsecond accuracy when locked to just a single satellite. Thus, in the preferred embodiment, the virtualized home theater service 14 and the interface components 100 and 104 include the GPS receivers 48, 120, and 140 in order to provide accurate and substantially synchronized real-time clocks.

Figure 14:
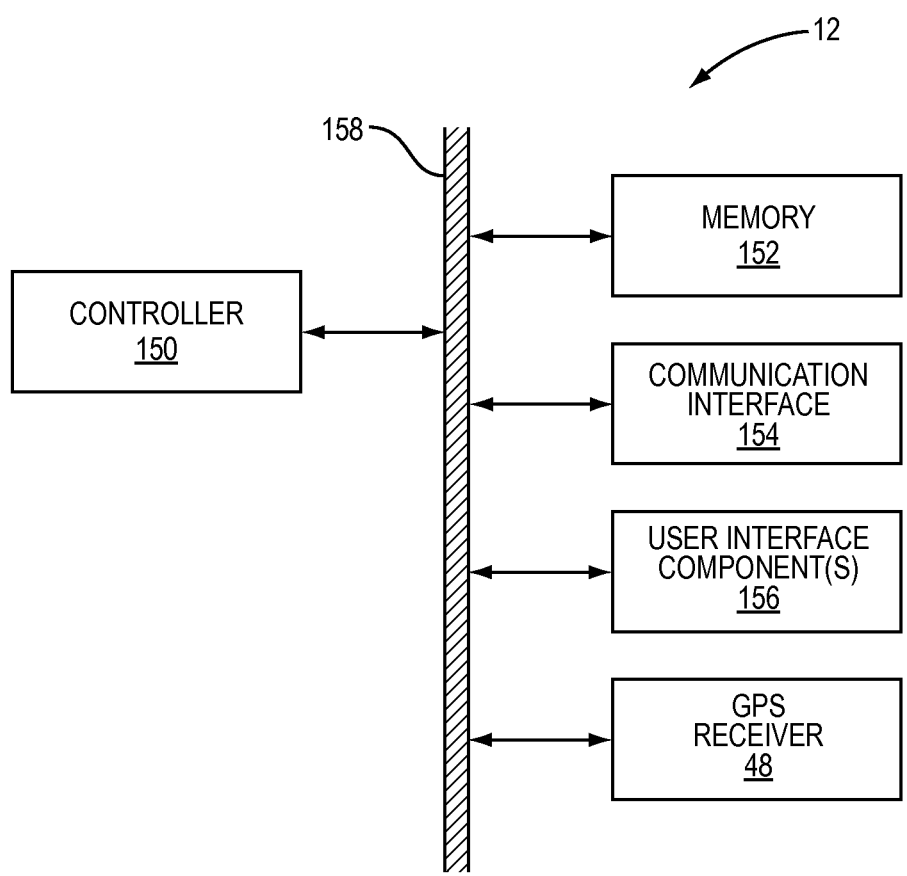
FIG. 14 is a block diagram of the central server of FIG. 1 according to one embodiment of the present disclosure.

FIG. 14 is a block diagram of the central server 12 of FIG. 1 according to one embodiment of the present disclosure. As illustrated, the central server 12 includes a controller 150 connected to memory 152, a communication interface 154, one or more user interface components 156, and the GPS receiver 48 by a bus 158 or similar mechanism. The controller 150 is a microprocessor, digital Application Specific Integrated Circuit (ASIC), Field Programmable Gate Array (FPGA), or the like. In this embodiment, the controller 150 is a microprocessor, and the virtualized home theater service 14 is implemented primarily in software and stored in the memory 152 for execution by the controller 150. The communication interface 154 is a wired or wireless communication interface that communicatively couples the central server 12 to the WAN 22. The one or more user interface components 156 may include, for example, a display, one or more user input components (e.g., a keypad), a speaker, or the like.

Those skilled in the art will recognize improvements and modifications to the embodiments of the present disclosure. All such improvements and modifications are considered within the scope of the concepts disclosed herein and the claims that follow.

What is claimed is:

1. A method of operation of a home theater component in a home theater comprising a plurality of home theater components including the home theater component, comprising:
   receiving a media content stream destined for the home theater component from a virtualized home theater service via a Wide Area Network (WAN) connection, wherein the media content stream has a plurality of absolute playback timestamps and is one of a plurality of media content streams sent from the virtualized home theater service to the plurality of home theater components in order for desired multimedia content to be presented at the home theater, and the plurality of media content streams comprises a different media content stream for each of the plurality of home theater components;
   providing playback of the media content stream according to the plurality of absolute playback timestamps for the media content stream, wherein providing playback of the media content stream comprises delaying the media content stream according to a delay adjustment value; and
   controlling the delay adjustment value during playback of the media content stream based on the plurality of absolute playback timestamps for the media content stream, wherein controlling the delay adjustment value comprises, for each absolute playback timestamp of at least a subset of the plurality of absolute playback timestamps for the media content stream, updating the delay adjustment value based on a difference between an absolute playback time defined by the absolute playback timestamp and a current time.

2. The method of claim 1 wherein the plurality of home theater components comprises a plurality of audio playback components in a surround sound configuration, and the home theater component is an audio playback component from the plurality of audio playback components, and wherein providing playback of the media content stream based on the plurality of absolute playback timestamps for the media content stream comprises playing an audio stream based on the plurality of absolute playback timestamps for the audio stream.

3. The method of claim 2 wherein the plurality of media content streams comprises a plurality of audio streams such that the media content stream is one of the plurality of audio streams destined for the audio playback component, and the plurality of audio streams comprises a different audio stream for each of the plurality of audio playback components.

4. The method of claim 1 wherein the plurality of home theater components comprises a plurality of audio playback components in a surround sound configuration and a video playback component, and the home theater component is the video playback component and wherein providing playback of the media content stream according to the plurality of absolute playback timestamps for the media content stream comprises providing playback of a video stream destined for the video playback component according to the plurality of absolute playback timestamps for the video stream.

5. The method of claim 1 wherein updating the delay adjustment value is further based on an output delay of the home theater component.

6. The method of claim 1 wherein each absolute playback timestamp of the plurality of absolute playback timestamps defines an absolute playback time that is delayed with respect to a corresponding time of transmission by an amount of time equal to or greater to a maximum delay value determined for the plurality of home theater components.

7. The method of claim 6 wherein the maximum delay value is a largest maximum network delay from among maximum network delays for the plurality of home theater components.

8. The method of claim 6 wherein the maximum delay value is a maximum total delay value among total delay values determined for the plurality of home theater components, where the total delay value for each home theater component of the plurality of home theater components is a sum of a maximum network delay for the home theater component and a worst-case internal delay for the home theater component.

9. The method of claim 6 wherein the maximum delay value is a maximum total delay value among total delay values determined for the plurality of home theater components, where the total delay value for each home theater component of the plurality of home theater components is a sum of a maximum network delay for the home theater component, a worst-case internal delay for the home theater component, and any additional delay requested by the home theater component.

10. The method of claim 6 wherein the maximum delay value is determined based on maximum network delays for the plurality of home theater components, and the method further comprises:
  determining the maximum network delay for the home theater component based on one or more transmit timestamps for the media content stream and a real-time clock of the home theater component; and
  reporting the maximum network delay for the home theater component to the virtualized home theater service.

11. The method of claim 1 wherein providing playback of the media content stream further comprises providing playback of the media content stream according to the plurality of absolute playback timestamps for a media content item and a real-time clock of the home theater component that is substantially synchronized with real-time clocks of the virtualized home theater service and all other home theater components of the plurality of home theater components.

12. The method of claim 11 wherein the real-time clocks of the plurality of home theater components and the virtualized home theater service are synchronized to an accuracy equal to or less than approximately 0.3 microseconds.

13. The method of claim 1 wherein the home theater component is an interface component connected to a legacy audio playback component such that the media content stream is an audio stream, and providing playback of the media content stream comprises providing playback of the audio stream via the legacy audio playback component according to the plurality of absolute playback timestamps.

14. The method of claim 1 wherein the home theater component is an interface component connected to a legacy video playback device such that the media content stream is a video stream, and providing playback of the media content stream comprises providing playback of the video stream via the legacy video playback device according to the plurality of absolute playback timestamps.

15. A home theater component in a home theater comprising a plurality of home theater components including the home theater component, comprising:
  a network interface communicatively coupling the home theater component to a Wide Area Network (WAN) via a router and adapted to receive a media content stream destined for the home theater component from a virtualized home theater service via the WAN, wherein the media content stream has a plurality of absolute playback timestamps and is one of a plurality of media content streams sent from the virtualized home theater service to the plurality of home theater components in order for desired multimedia content to be presented at the home theater, and the plurality of media content streams comprises a different media content stream for each of the plurality of home theater components;
  circuitry adapted to provide playback of the media content stream according to the plurality of absolute playback timestamps for the media content stream comprising a delay buffer adapted to delay the media content stream from the network interface according to a delay adjustment value controlled based on the plurality of absolute playback timestamps for the media content stream; and
  a delay adjustment calculation function adapted to, for each absolute playback timestamp of at least a subset of the plurality of absolute playback timestamps for the media content stream, update the delay adjustment value based on a difference between an absolute playback time defined by the absolute playback timestamp and a current time.

16. The home theater component of claim 15 wherein each absolute playback timestamp of the plurality of absolute playback timestamps defines an absolute playback time that is delayed with respect to a corresponding time of transmission by an amount of time equal to or greater than a maximum delay value determined for the plurality of home theater components based on maximum network delays for the plurality of home theater components, and the home theater component further comprises a maximum network delay calculation function adapted to:
  determine the maximum network delay for the home theater component based on one or more transmit timestamps for the media content stream and a real-time clock of the home theater component; and
  report the maximum network delay for the home theater component to the virtualized home theater service.

17. The home theater component of claim 15 wherein the network interface is a local wireless network interface.

* * * * *